United States Patent
Sone et al.

(10) Patent No.: US 9,350,479 B2
(45) Date of Patent: May 24, 2016

(54) APPARATUS AND METHOD FOR MONITORING WAVELENGTH TUNABLE OPTICAL FILTER

(71) Applicant: FUJITSU LIMITED, Kawasaki-shi, Kanagawa (JP)

(72) Inventors: Kyosuke Sone, Kawasaki (JP); Yasuhiko Aoki, Yokohama (JP); Goji Nakagawa, Sagamihara (JP); Shoichiro Oda, Fuchu (JP)

(73) Assignee: FUJITSU LIMITED, Kawasaki (JP)

(*) Notice: Subject to any disclaimer, the term of this patent is extended or adjusted under 35 U.S.C. 154(b) by 142 days.

(21) Appl. No.: 14/096,675

(22) Filed: Dec. 4, 2013

(65) Prior Publication Data
US 2014/0205281 A1    Jul. 24, 2014

(30) Foreign Application Priority Data
Jan. 24, 2013 (JP) ................... 2013-011489

(51) Int. Cl.
*H04J 14/02* (2006.01)
*H04B 10/079* (2013.01)

(52) U.S. Cl.
CPC ...... *H04J 14/0212* (2013.01); *H04B 10/07957* (2013.01); *H04J 14/0221* (2013.01)

(58) Field of Classification Search
CPC .......................... H04J 14/0201–14/0205; H04J 14/021–14/0212; H04B 10/0795; H04B 10/07957; H04Q 2001/0009; H04Q 2001/0016–2001/0018; H04Q 11/0062
See application file for complete search history.

(56) References Cited

U.S. PATENT DOCUMENTS

| | | | |
|---|---|---|---|
| 2003/0123789 A1* | 7/2003 | Miyata et al. | 385/24 |
| 2011/0081146 A1 | 4/2011 | Nakajima et al. | |
| 2011/0222864 A1* | 9/2011 | Vassilieva | 398/158 |
| 2012/0170937 A1* | 7/2012 | Van Leeuwen | 398/76 |
| 2012/0183305 A1* | 7/2012 | Umnov | H04B 10/0775 398/152 |

(Continued)

FOREIGN PATENT DOCUMENTS

| JP | 2004-364033 | 12/2004 |
|---|---|---|
| JP | 2011-254309 | 12/2011 |

OTHER PUBLICATIONS

Masahiko Jinno, et al., "Distance-Adaptive Spectrum Resource Allocation in Spectrum-Sliced Elastic Optical Path Network", IEEE Communications Magazine, Aug. 2010, pp. 138-145.

(Continued)

*Primary Examiner* — David Payne
*Assistant Examiner* — Casey Kretzer
(74) *Attorney, Agent, or Firm* — Fujitsu Patent Center

(57) ABSTRACT

A monitoring apparatus, that monitors a wavelength tunable optical filter for filtering an optical signal to which a frequency modulation component is added, includes: an optical filter configured to filter the optical signal output from the wavelength tunable optical filter; a detector configured to detect amplitude of the frequency modulation component included in the optical signal output from the optical filter; a generator configured to generate an output-side amplitude distribution representing a distribution of the amplitude of the frequency modulation component detected by the detector, by sweeping a transmission wavelength of the optical filter; and a monitoring unit configured to monitor arrangement of a transmission wavelength band of the wavelength tunable optical filter with respect to a spectrum of the optical signal based on the output-side amplitude distribution generated by the generator.

7 Claims, 16 Drawing Sheets

(56) References Cited

U.S. PATENT DOCUMENTS

2012/0237212 A1 9/2012 Nishihara et al.
2012/0318965 A1* 12/2012 Tosaki ................... 250/227.11

OTHER PUBLICATIONS

Extended European Search Report dated May 9, 2014 for corresponding European Application No. 13195453.9, 5 pages.

* cited by examiner

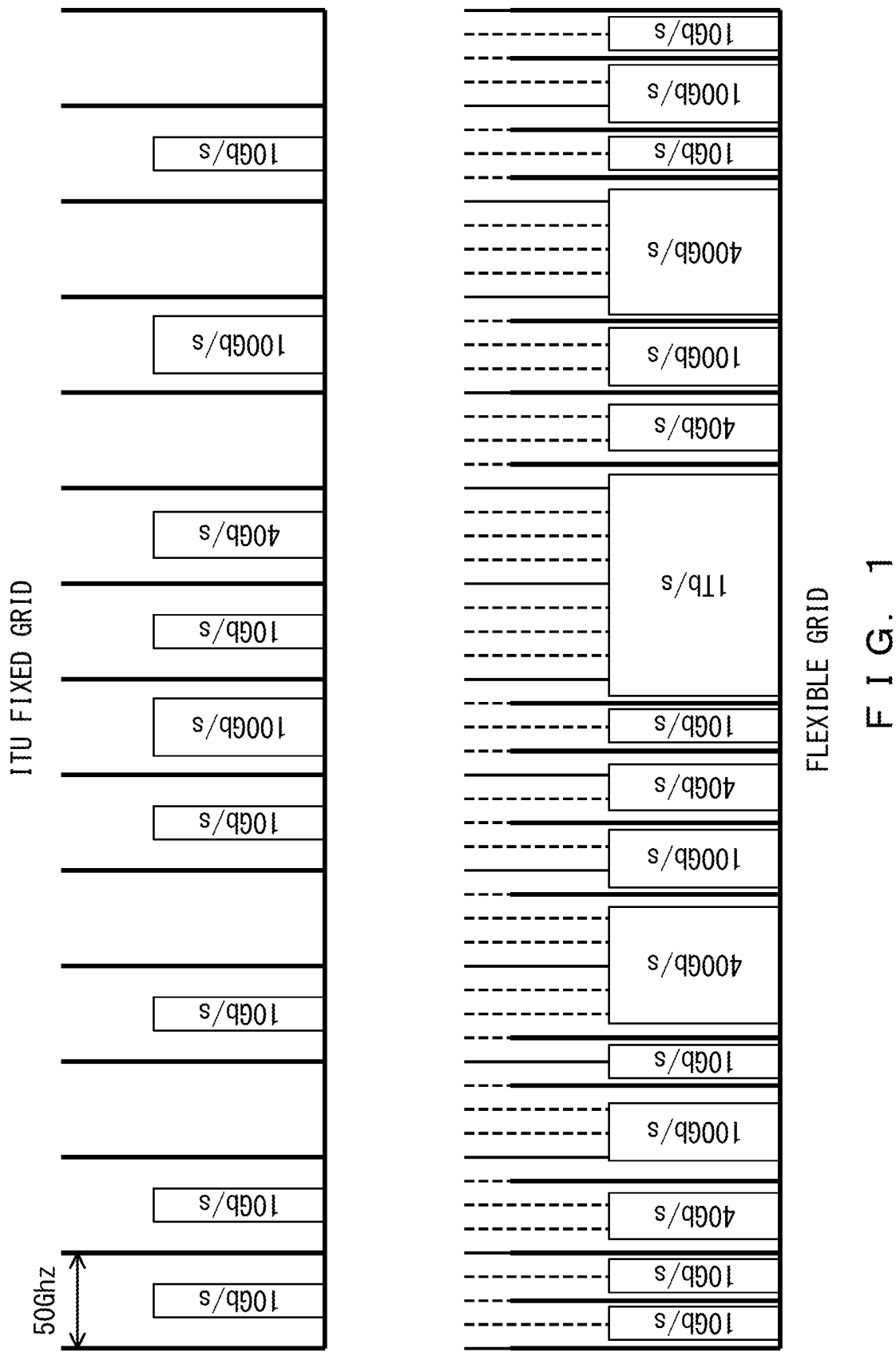

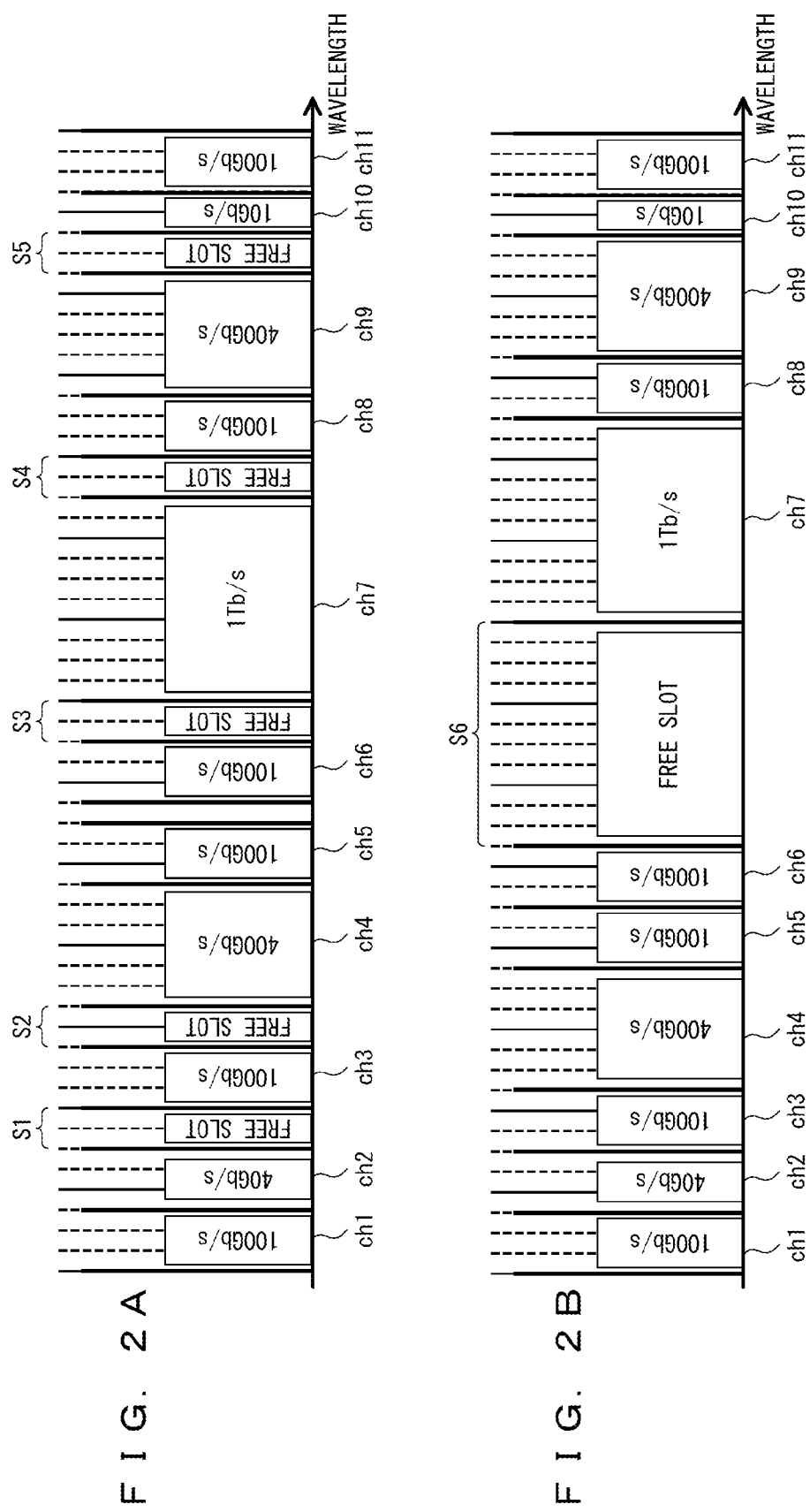
F I G. 2A   F I G. 2B

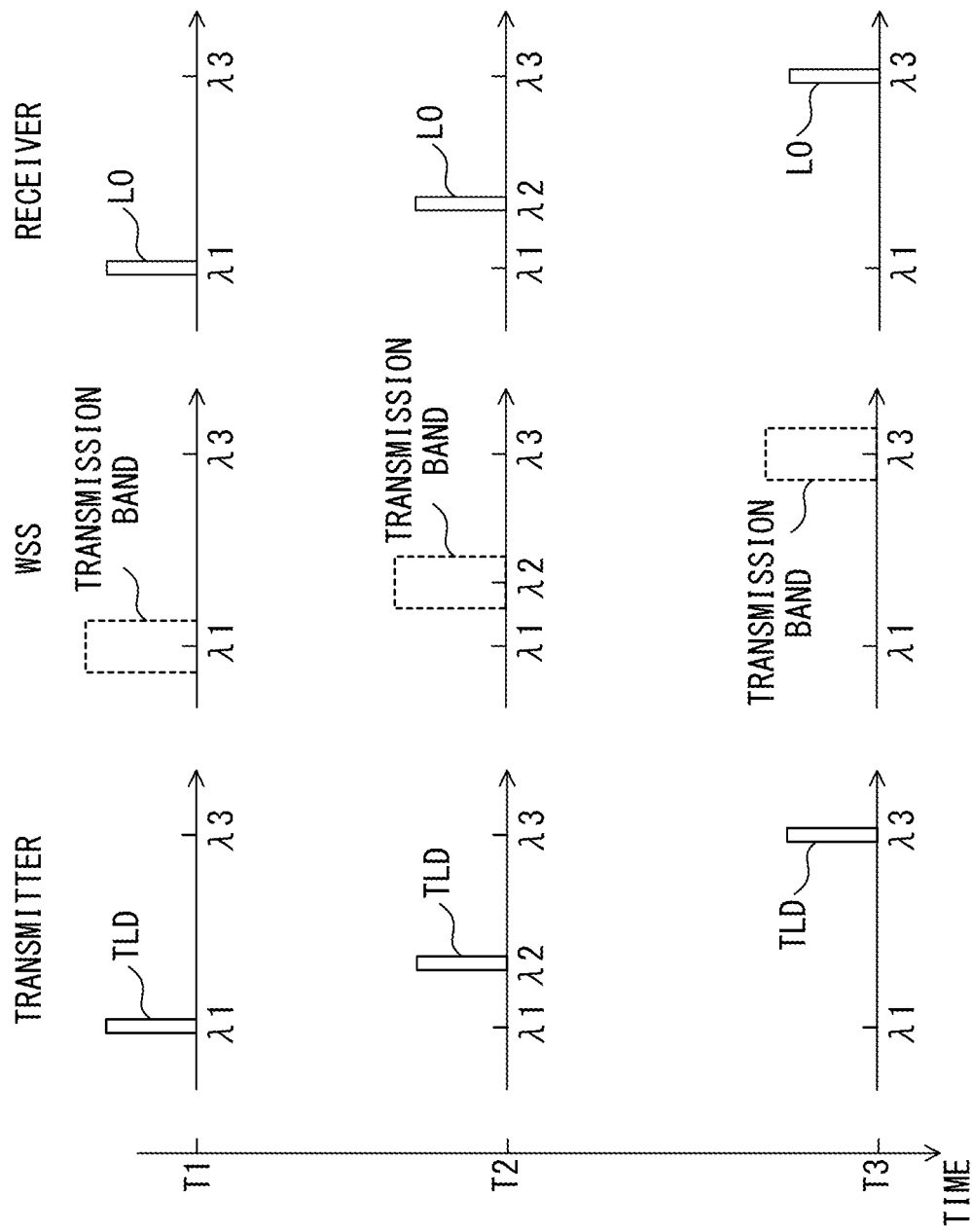
F I G. 4

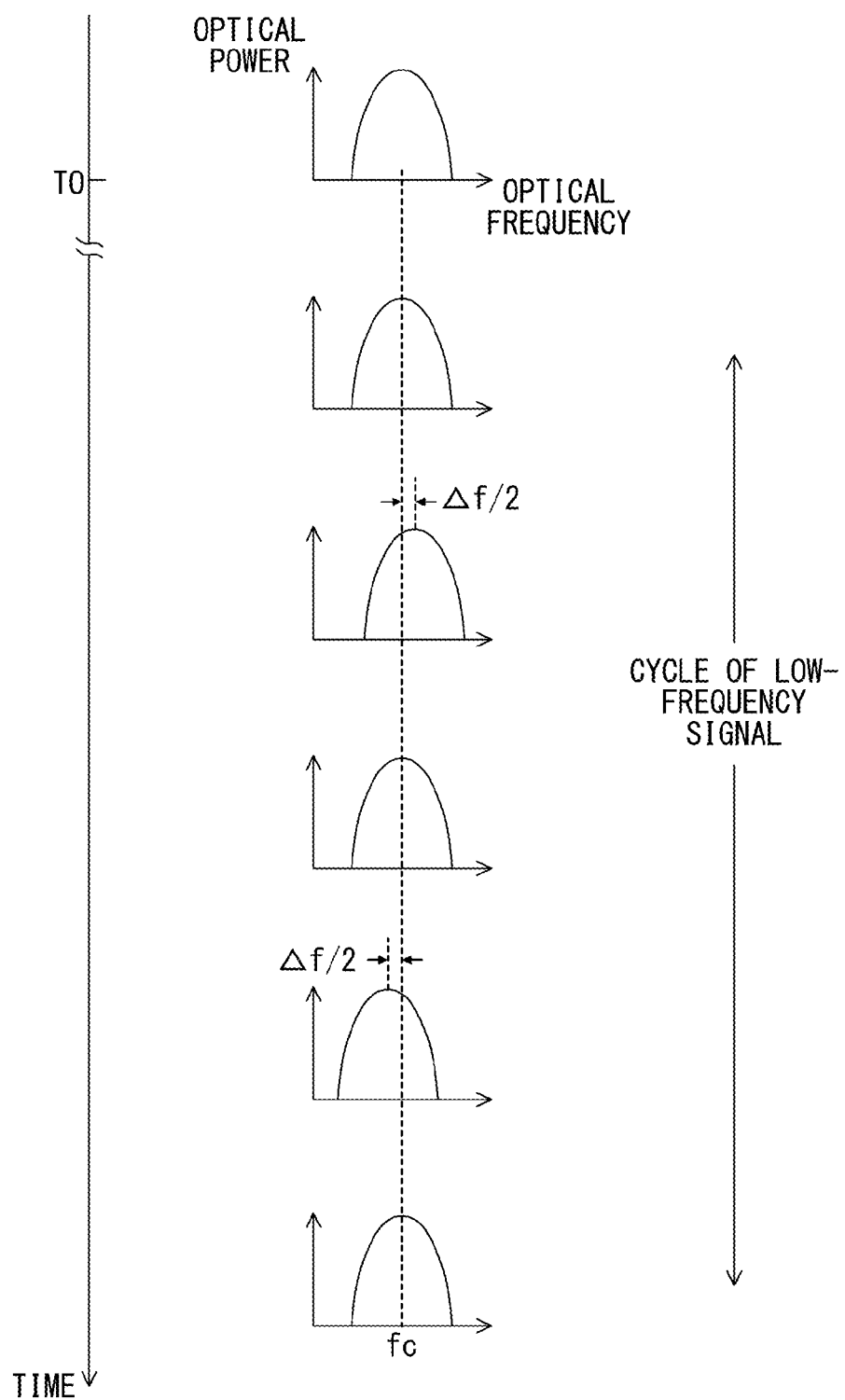
F I G. 6

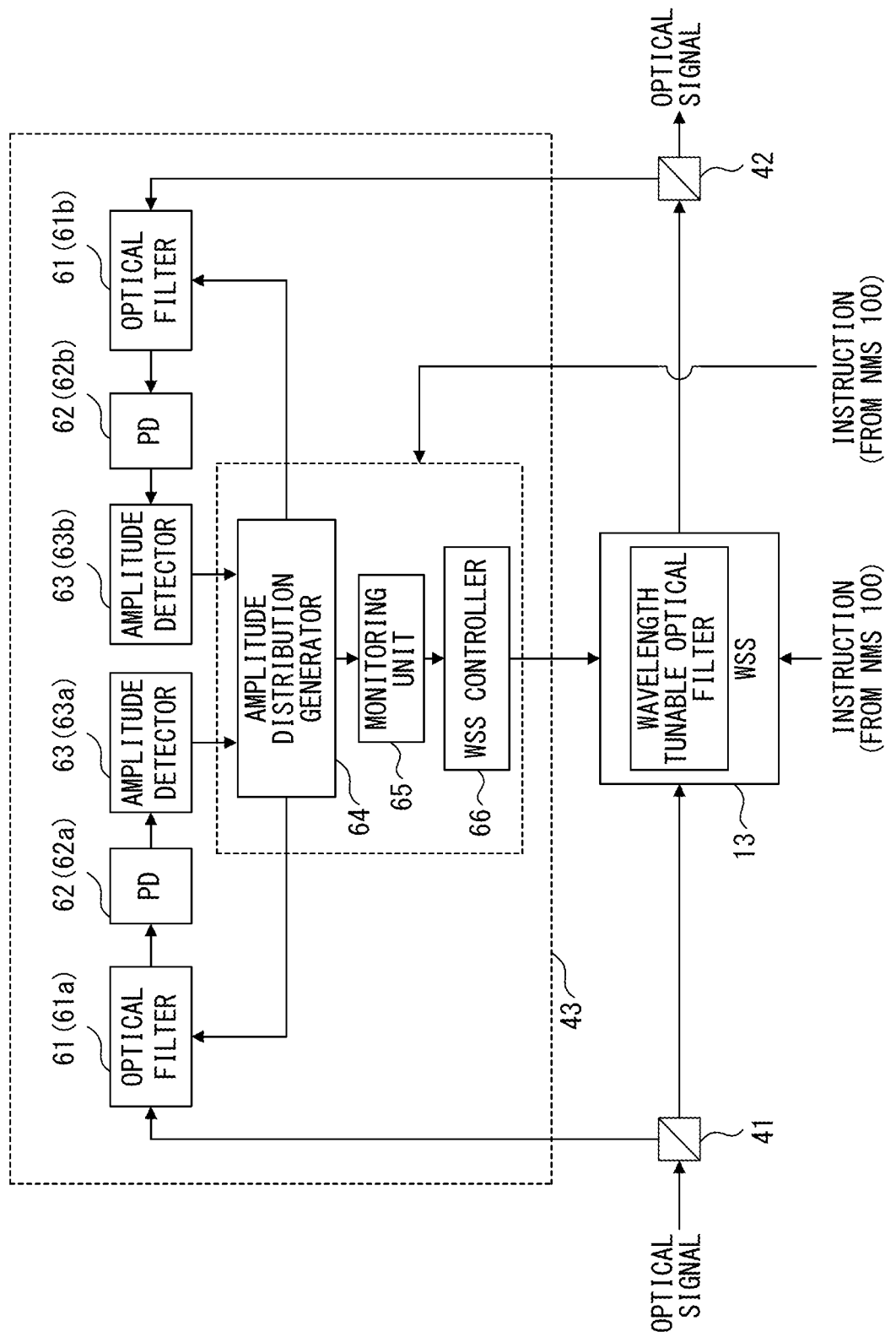
F I G. 7

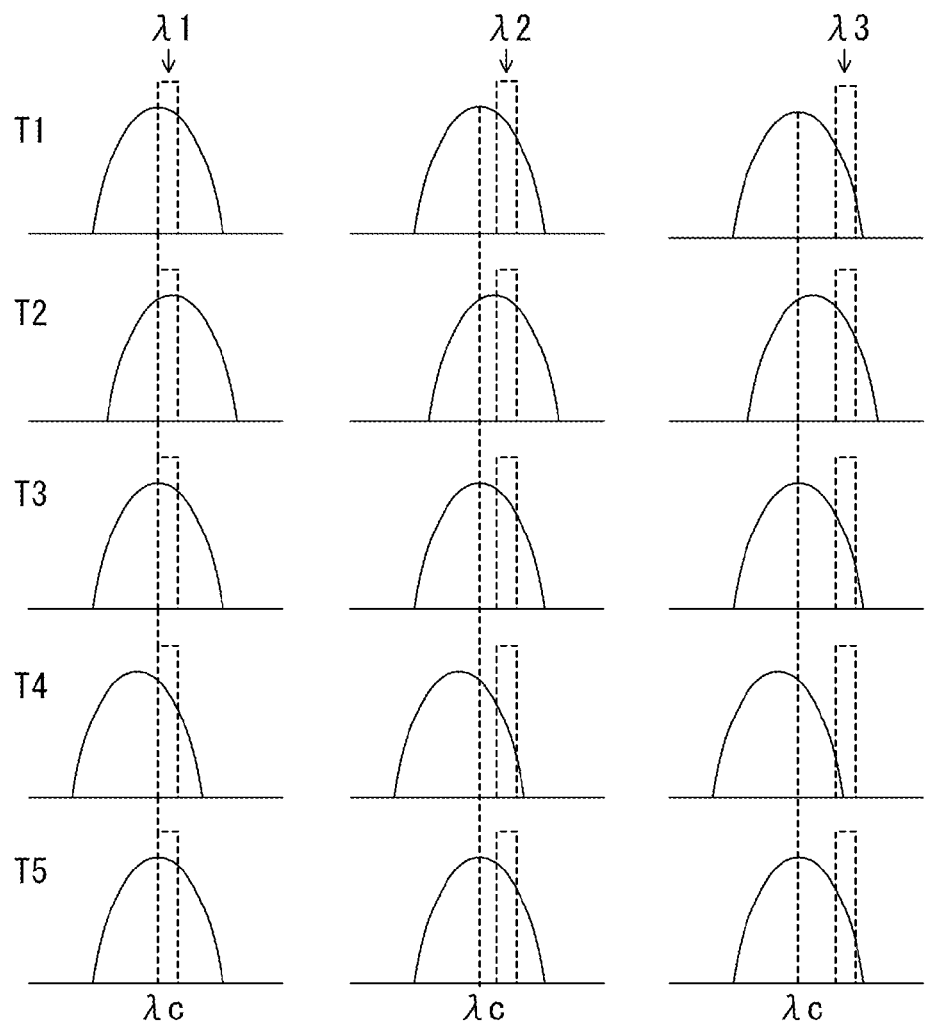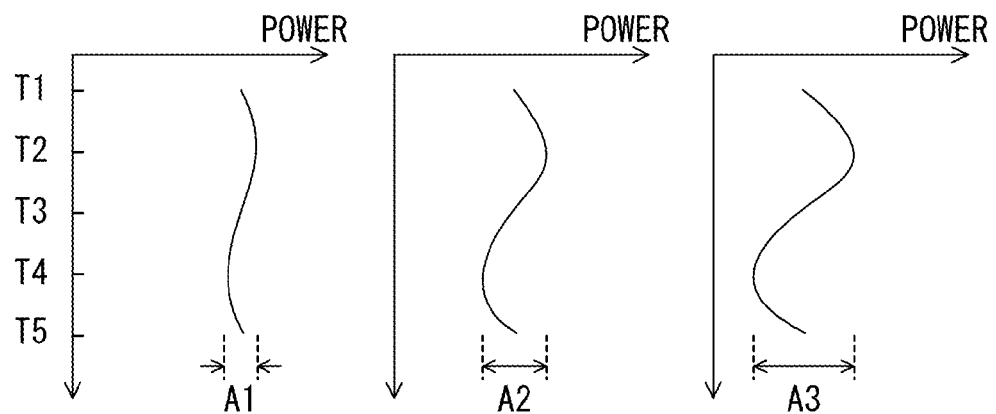
FIG. 10

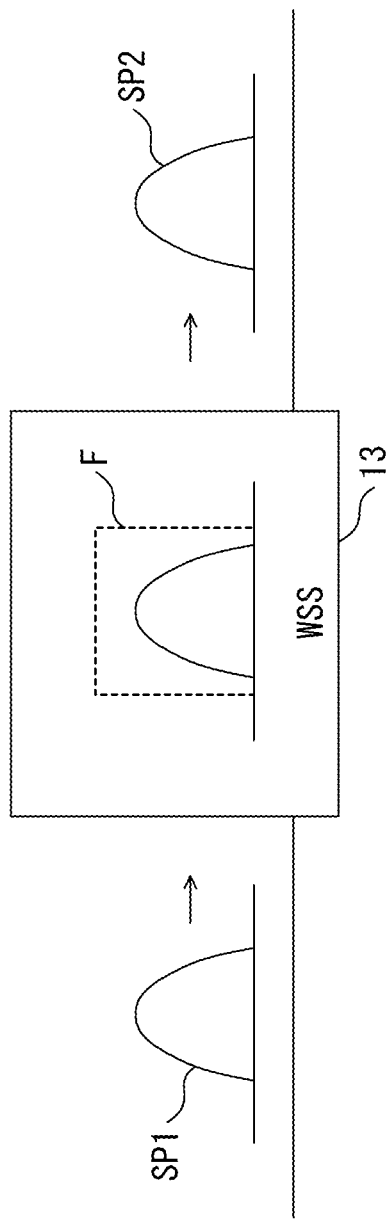
F I G. 1 2 A
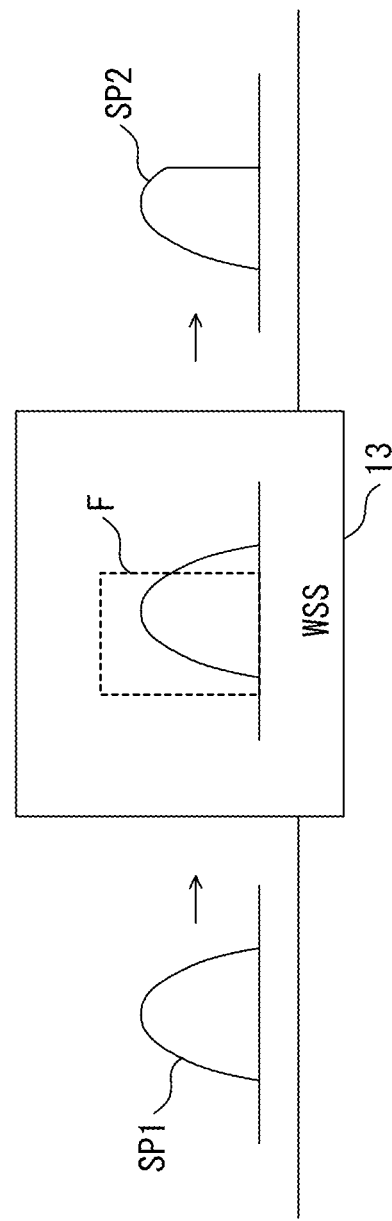
F I G. 1 2 B

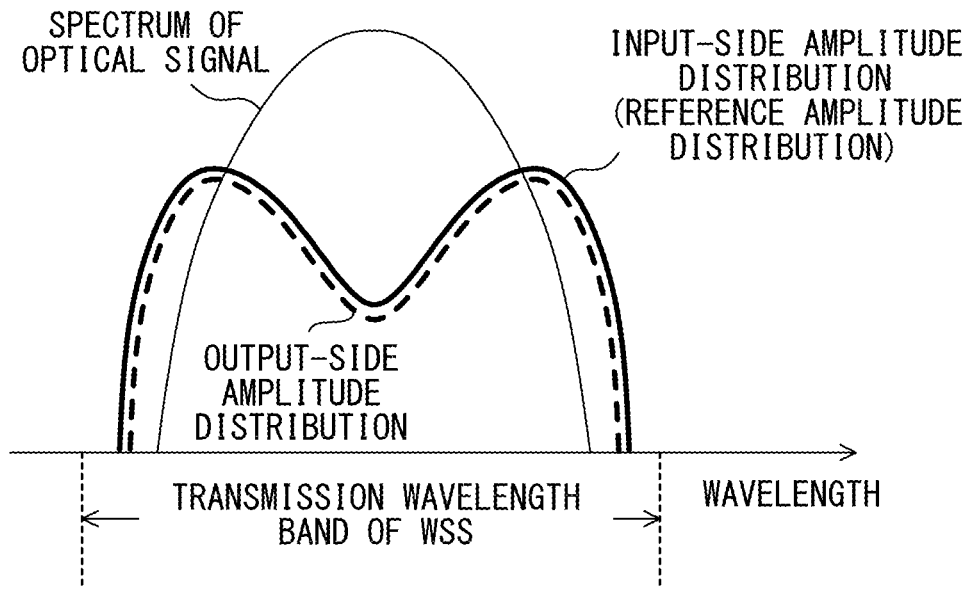
F I G. 1 4 A
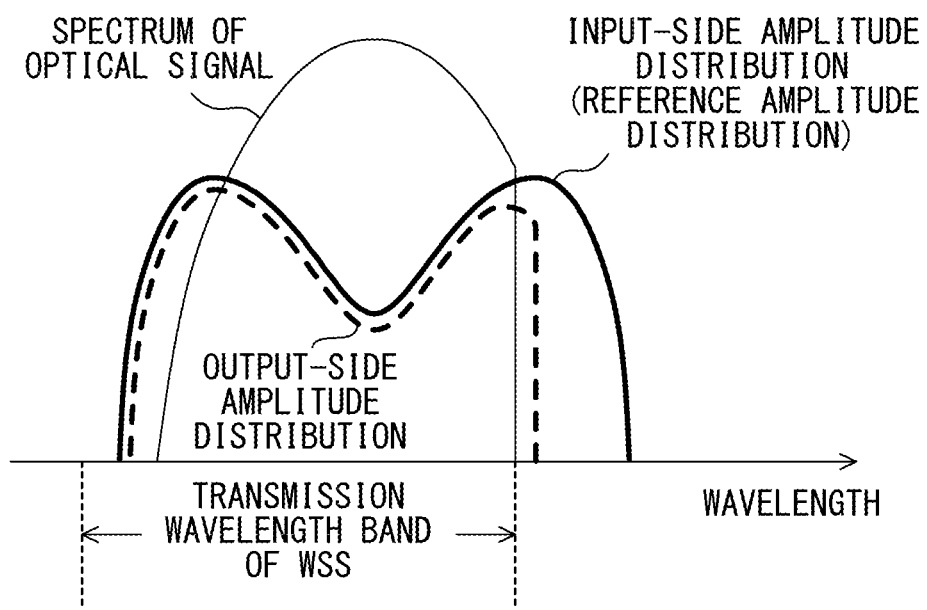
F I G. 1 4 B

APPARATUS AND METHOD FOR MONITORING WAVELENGTH TUNABLE OPTICAL FILTER

CROSS-REFERENCE TO RELATED APPLICATION

This application is based upon and claims the benefit of priority of the prior Japanese Patent Application No. 2013-011489, filed on Jan. 24, 2013, the entire contents of which are incorporated herein by reference.

FIELD

The embodiments discussed herein are related to an apparatus and a method for monitoring a wavelength tunable optical filter and an optical add-drop multiplexer that has a wavelength tunable optical filter.

BACKGROUND

As one technique for realizing an increase in the capacity of an optical communication network, wavelength division multiplexing (WDM) is widely used. According to WDM, a plurality of channels of different wavelengths are multiplexed.

In an optical network using WDM, an optical add-drop multiplexer (ROADM: Reconfigurable Optical Add-Drop Multiplexer) is provided to each optical node. The optical add-drop multiplexer is capable of separating an optical signal at a specified wavelength from a WDM optical signal and guiding the signal to a client, and of inserting a client signal generated by the client into the WDM optical signal. Accordingly, the optical add-drop multiplexer includes wavelength selective switch (WSS) that selectively passes an optical signal at a specified wavelength from a plurality of optical signals in the WDM optical signal.

The wavelength selective switch selects a channel at a specified wavelength. For this purpose, the wavelength selective switch includes a wavelength tunable optical filter. That is, the wavelength selective switch controls the transmission wavelength band of the wavelength tunable optical filter such that an optical signal at a specified wavelength is selected. However, if the transmission wavelength band of the wavelength tunable optical filter is not appropriately controlled, the quality of a selected optical signal is reduced. Thus, the optical add-drop multiplexer preferably includes a function of monitoring whether the transmission wavelength band of the wavelength tunable optical filter is appropriately controlled.

As a related technique, an apparatus for detecting a deviation of the wavelength transmission characteristics of a wavelength multiplexing filter with high accuracy is being proposed. This apparatus includes a signal selector, an input-side OCM (Optical Channel Monitor), an output-side OCM, and a detector. The signal selector performs wavelength multiplexing of optical signals. The input-side OCM acquires a spectrum of an optical signal to be input to the wavelength multiplexing filter. The output-side OCM acquires the spectrum of an optical signal output from the wavelength multiplexing filter. The detector detects a deviation of the wavelength transmission characteristics of the wavelength multiplexing filter based on the difference between the spectra acquired by the input-side OCM and the output-side OCM. (For example, Japanese Laid-Open Patent Publication No. 2011-254309)

As other related techniques, there are known Japanese Laid-Open Patent Publication No. 2004-364033, and "Distance-Adaptive Spectrum Resource Allocation in Spectrum-Sliced Elastic Optical Path Network", Masahiko Jinno et. al., IEEE Communications Magazine, August 2010.

In recent years, there is a demand for a flexible optical network to flexibly cope with a change in traffic, unexpected update of a network configuration, and the like. In such an optical network, the bit rate and/or the modulation scheme of each optical channel is dependent on the required transmission capacity and transmission distance. That is, the spectrum bandwidths of the optical channels are not the same. Thus, to effectively use the limited resources (in this case, the wavelength), a WDM transmission system adopting a flexible grid is being put to practical use.

With a conventional fixed grid system, channels of WDM are arranged at predetermined intervals. On the other hand, with a flexible grid system, channels of WDM may be arranged at arbitrary wavelengths. Accordingly, in a WDM transmission system adopting the flexible grid, the transmission band of a wavelength tunable optical filter for selecting a channel at a specified wavelength from a WDM optical signal is required to be accurately controlled.

SUMMARY

According to an aspect of the embodiments, a monitoring apparatus, that monitors a wavelength tunable optical filter for filtering an optical signal to which a frequency modulation component is added, includes: an optical filter configured to filter the optical signal output from the wavelength tunable optical filter; a detector configured to detect amplitude of the frequency modulation component included in the optical signal output from the optical filter; a generator configured to generate an output-side amplitude distribution representing a distribution of the amplitude of the frequency modulation component detected by the detector, by sweeping a transmission wavelength of the optical filter; and a monitoring unit configured to monitor arrangement of a transmission wavelength band of the wavelength tunable optical filter with respect to a spectrum of the optical signal based on the output-side amplitude distribution generated by the generator.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram for describing a fixed grid and a flexible grid;

FIGS. 2A and 2B are diagrams for describing wavelength defragmentation;

FIG. 4 is a diagram for describing wavelength control performed in wavelength defragmentation;

FIG. 6 is a diagram for describing frequency modulation;

FIG. 7 illustrates an example of a monitoring apparatus;

FIG. 10 is a diagram for describing a method for generating an amplitude distribution;

FIGS. 12A and 12B are diagrams for describing a case where the transmission wavelength band of a filter is appropriately controlled and a case where it is not appropriately controlled;

FIGS. 14A and 14B illustrate examples of a wavelength distribution obtained with respect to a spectrum of an optical signal;

DESCRIPTION OF EMBODIMENTS

Figure 3:
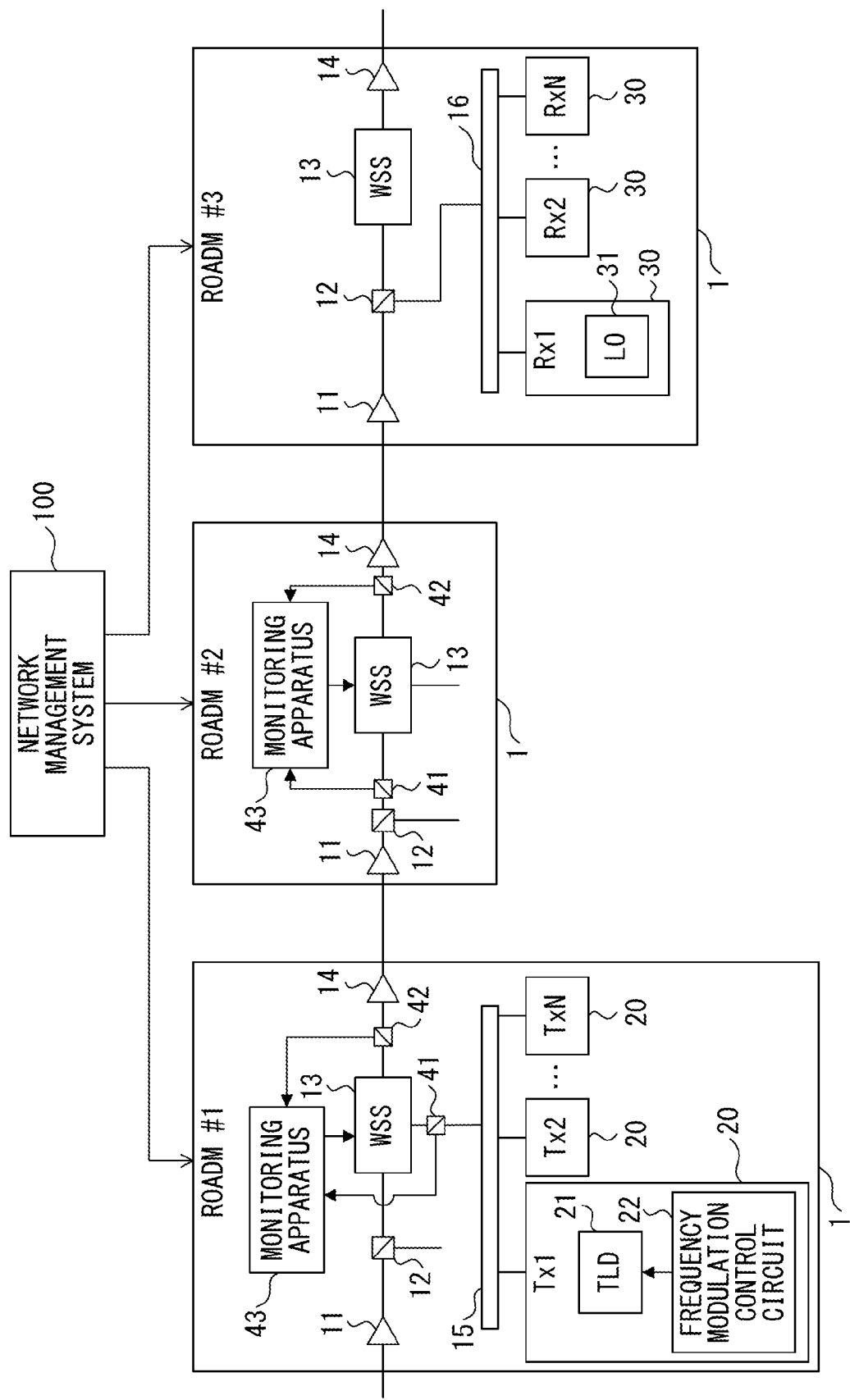
FIG. 3 illustrates an example of a WDM transmission system.

A monitoring apparatus and a monitoring method for a wavelength tunable optical filter according to an embodiment of the present invention are used in an optical network that uses WDM. In WDM, a plurality of channels at different wavelengths are multiplexed in a WDM optical signal. Each channel of WDM is arranged on a predetermined fixed grid, for example. Also, in recent years, a configuration of arranging a channel of WDM on a flexible grid is being developed.

FIG. 1 is a diagram for describing a fixed grid and a flexible grid. The fixed grid is recommended by ITU (International Telecommunication Union), for example. According to the fixed grid recommended by ITU (hereinafter, referred to as an ITU fixed grid), channels are arranged being spaced at 100 GHz or 50 GHz. In the example illustrated in FIG. 1, six 10-Gbps channels, one 40-Gbps channel, and two 100-Gbps channels are arranged on the ITU fixed grid.

However, with the optical network on the fixed grid, the efficiency in the use of resources (in this case, the wavelength or the frequency) is sometimes low. For example, in the case the bandwidth of each channel is narrow (the 10-Gbps channel in the example illustrated in FIG. 1), even if these channels are arranged being spaced at less than 50 GHz, the interference between the channels is sufficiently low. In this case, if these channels are arranged being spaced at less than 50 GHz, the efficiency in the use of resources will be improved. Thus, there is a demand to be able to flexibly arrange channels of WDM.

According to a flexible grid, channels of WDM are arranged using "slots". The slots are realized by dividing the ITU fixed grid, for example. For example, the bandwidth of a slot is 12.5 GHz.

In the example illustrated in FIG. 1, 10-Gbps channels, 40-Gbps channels, 100-Gbps channels, 400-Gbps channels, and a 1-Tbps channel are arranged on a flexible grid. Two slots are assigned to the 10-Gbps channel. Three slots are assigned to each of the 40-Gbps channel and the 100-Gbps channel. Six slots are assigned to the 400-Gbps channel. Ten slots are assigned to the 1-Tbps channel. In this manner, according to the optical network on a flexible grid, smaller resources are assigned to a low-speed channel, and larger resources are assigned to a high-speed channel, and thus, the efficiency in the use of resources is high.

However, in the optical network on a flexible grid, if setting, change, and disconnection of an optical path are repeatedly performed, a free slot (or an unused slot) whose bandwidth is too narrow to set a channel may occur. In the example illustrated in FIG. 2A, a free slot S1 is present between a channel ch2 and a channel ch3. Similarly, a free slot S2 is present between the channel ch3 and a channel ch4, a free slot S3 is present between a channel ch6 and a channel ch7, a free slot S4 is present between the channel ch7 and a channel ch8, and a free slot S5 is present between a channel ch9 and a channel ch10. The bandwidths of these free slots S1 to S5 are too narrow to arrange desired channels (at least not wide band channels).

Wavelength defragmentation is performed so as to enable effective use of such free slots. According to wavelength defragmentation, a plurality of free slots are combined by appropriately shifting the wavelengths of channels arranged on the flexible grid.

In the example illustrated in FIG. 2A, the center wavelengths of the channels ch3, ch4, ch5, and ch6 are respectively shifted to a shorter wavelength side. On the other hand, the center wavelengths of the channels ch7, ch8, and ch9 are respectively shifted to a longer wavelength side. As a result, a plurality of free slots illustrated in FIG. 2A are combined, and a free slot S6 with a wide bandwidth is generated as illustrated in FIG. 2B. The free slot S6 has a sufficiently wide bandwidth, and one or more desired channels may be arranged therein.

FIG. 3 illustrates an example of a WDM transmission system. An optical add-drop multiplexer (ROADM: Reconfigurable Optical Add-Drop Multiplexer) 1 is provided to a node of the WDM transmission system. In FIG. 3, ROADM #1 to ROADM #3 are illustrated.

As illustrated in FIG. 3, the ROADM 1 includes an optical amplifier 11, an optical splitter 12, a wavelength selective switch (WSS) 13, an optical amplifier 14, an optical coupler 15, an optical distributor 16, a plurality of optical transmitters 20 (Tx1 to TxN), and a plurality of optical receivers 30 (Rx1 to RxN). The optical amplifier 11 amplifies an input WDM optical signal. The optical splitter 12 guides the WDM optical signal which has been amplified by the optical amplifier 11 to the wavelength selective switch 13 and the optical distributor 16.

The wavelength selective switch 13 includes a wavelength tunable optical filter. The wavelength selective switch 13 uses the wavelength tunable optical filter to select an optical signal at a specified wavelength from a plurality of optical signals included in the input WDM optical signal, and outputs the selected optical signal. At this time, the wavelength selective switch 13 selects an optical signal at a wavelength specified by a network management system 100. Also, the wavelength selective switch 13 may insert an optical signal guided from the optical coupler 15 into the WDM optical signal. The optical amplifier 14 amplifies the WDM optical signal output from the wavelength selective switch 13.

The optical transmitter 20 includes a light source (TLD) 21, and a frequency modulation control circuit 22. The optical transmitter 20 generates an optical signal by modulating output light of the light source 21 by a data signal. The data signal is a client signal generated by a client, for example. The frequency modulation control circuit 22 adds a frequency modulation component to the optical signal mentioned above. Additionally, the optical frequencies (or the carrier frequencies) of optical signals generated by a plurality of optical transmitters 20 (Tx1 to TxN) are controlled to be different from each other.

The optical coupler 15 combines the optical signals transmitted from a plurality of optical transmitters 20 (Tx1 to TxN). Then, the optical signal output from the optical coupler 15 is guided to the wavelength selective switch 13. Note that, in FIG. 3, the optical coupler 15 and the optical transmitters 20 (Tx1 to TxN) of the ROADMs #2 and #3 are omitted.

The optical distributor 16 guides the input WDM optical signal amplified by the optical amplifier 11 to a plurality of optical receivers 30 (Rx1 to RxN). Although not restricted, the optical distributor 16 is realized by an optical coupler, for example.

The optical receiver 30 is a coherent receiver, and includes a local oscillation light source (LO) 31 for receiving an optical signal at a specified wavelength. The frequency of local oscillation light generated by the local oscillation light source 31 is controlled to approximately match the frequency of an optical signal at a specified wavelength. For example, when the optical receiver 30 (Rx1) of the ROADM #3 is to receive an optical signal transmitted from the optical transmitter 20 (Tx1) of the ROADM #1, the optical frequency of the local oscillation light source 31 of the optical receiver 30 (Rx1) of the ROADM #3 is controlled so as to be approximately the same as the optical frequency of the light source 21 of the optical transmitter 20 (Tx1) of the ROADM #1. Note that, in FIG. 3, the optical distributor 16 and the optical receivers 30 (Rx1 to RxN) of the ROADMs #1 and #2 are omitted.

The network management system 100 manages the operation of the WDM transmission system described above. That is, the network management system 100 manages the setting, change, and disconnection of an optical path in the WDM transmission system described above. For this purpose, the network management system 100 issues an optical path control instruction for setting, change, and disconnection of an optical path to each ROADM 1. For example, the optical path control instruction includes an instruction regarding a wavelength to be selected by the wavelength selective switch 13, an instruction regarding the frequency of the light source 21 of each optical transmitter 20, and an instruction regarding the frequency of the local oscillation light of each optical receiver 30. Also, the network management system 100 issues a wavelength defragmentation instruction for realizing wavelength defragmentation to each ROADM 1. For example, the wavelength defragmentation instruction includes an instruction for controlling the transmission wavelength of the wavelength selective switch 13, an instruction regarding the frequency of the light source 21 of each optical transmitter 20, and an instruction regarding the frequency of the local oscillation light of each optical receiver 30.

FIG. 4 is a diagram for describing wavelength control performed in wavelength defragmentation. Here, it is assumed that an optical path of wavelength λ1 is set between the optical transmitter 20 and the optical receiver 30 at time T1. In this case, the wavelength of light generated by the light source 21 of the optical transmitter 20 (hereinafter referred to as TLD wavelength) is controlled to be λ1. Moreover, the wavelength of light generated by the local oscillation light source 31 of the optical receiver 30 (hereinafter referred to as LO wavelength) is also controlled to be λ1. Furthermore, the transmission wavelength band of the wavelength tunable optical filter of the wavelength selective switch 13 provided between the optical transmitter 20 and the optical receiver 30 is controlled to pass wavelength λ1. In the example illustrated in FIG. 3, the wavelength tunable optical filters of the ROADMs #1 and #2 are controlled to pass wavelength λ1.

Wavelength defragmentation is performed according to an instruction from the network management system 100. In this example, the wavelength of the optical path mentioned above shifts from λ1 to λ3. Moreover, it is not desirable to interrupt the communication by wavelength defragmentation.

Accordingly, to perform wavelength defragmentation without interrupting the communication, the network management system 100 shifts the TLD wavelength, the LO wavelength, and the transmission wavelength of the wavelength selective switch 13 in synchronization with one another. By this procedure, at time T2, the TLD wavelength and the LO wavelength are controlled to be λ2. Also, the transmission wavelength of the wavelength selective switch 13 is controlled to pass λ2. Furthermore, at time T3, the TLD wavelength and the LO wavelength are controlled to be λ3. Furthermore, the transmission wavelength of the wavelength selective switch is controlled to pass λ3. As a result, wavelength defragmentation of shifting the wavelength of the optical path from λ1 to λ3 is realized without interrupting the communication in the optical path.

As described, with wavelength defragmentation of the embodiment, the TLD wavelength, the LO wavelength, and the transmission wavelength of the wavelength selective switch 13 are controlled substantially in parallel. At this time, if, for example, the transmission wavelength of the wavelength selective switch 13 is not appropriately controlled, a part of the spectrum of an optical signal is removed at the wavelength selective switch 13. In this case, the quality of the optical signal is reduced. Accordingly, the ROADM 1 of the embodiment includes a monitoring function for deciding whether the transmission wavelength of the wavelength tunable optical filter of the wavelength selective switch 13 is appropriately controlled or not.

That is, as illustrated in FIG. 3, the ROADM 1 includes optical splitters 41 and 42, and a monitoring apparatus 43. The optical splitter 41 splits a WDM optical signal input to the wavelength selective switch 13, and guides the split WDM optical signal to the monitoring apparatus 43. The optical splitter 42 splits a WDM optical signal output from the wavelength selective switch 13, and guides the split WDM optical signal to the monitoring apparatus 43. The monitoring apparatus 43 monitors the arrangement of the transmission wavelength band of the wavelength tunable optical filter of the wavelength selective switch 13 based on the WDM optical signal input to the wavelength selective switch 13 and the WDM optical signal output from the wavelength selective switch 13. However, the monitoring apparatus 43 may also monitor the arrangement of the transmission wavelength band of the wavelength tunable optical filter based on the WDM optical signal output from the wavelength selective switch 13, without using the WDM optical signal input to the wavelength selective switch 13.

The monitoring apparatus 43 determines whether the transmission wavelength of the wavelength tunable optical filter that passes the optical signal is appropriately controlled or not, by using the frequency modulation component included in an optical signal. Accordingly, when using the monitoring method of the embodiment, frequency modulation is performed by the frequency modulation control circuit 22 in the optical transmitter 20 to add a frequency modulation component to the optical signal.

Figure 5:
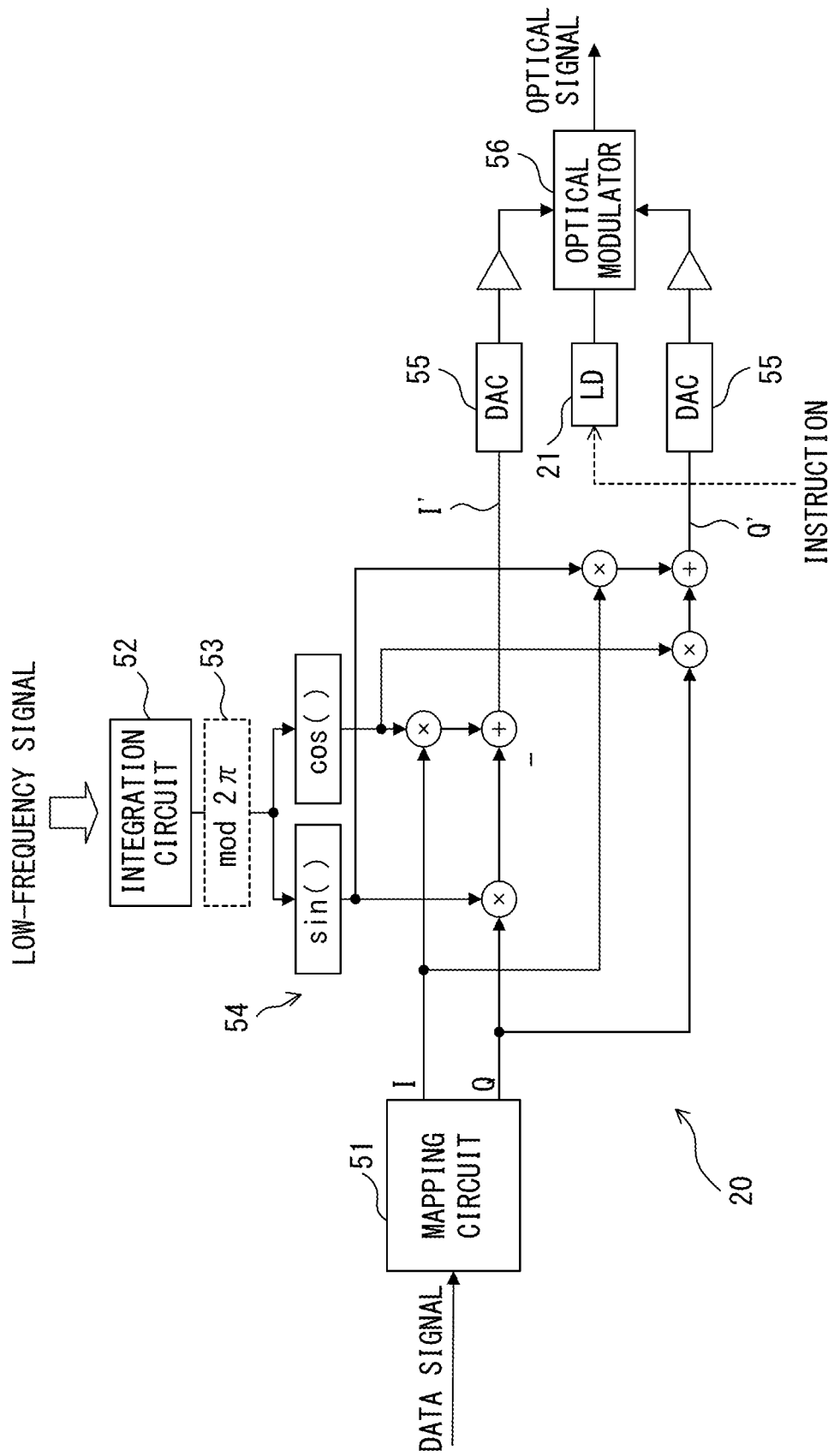
FIG. 5 illustrates an example of an optical transmitter.

FIG. 5 illustrates an example of the optical transmitter 20. As illustrated in FIG. 5, the optical transmitter 20 includes a mapping circuit 51, an integration circuit 52, a mod 2π circuit 53, a rotation operation circuit 54, a D/A converter 55, an optical modulator 56, and the light source 21. The optical transmitter 20 of this example realizes frequency modulation by digital signal processing. However, the configuration for adding a frequency modulation component to an optical signal is not restricted to the configuration illustrated in FIG. 5 or the method thereof.

The mapping circuit 51 maps a transmission data signal to an I-component data sequence and a Q-component data sequence. The integration circuit 52 integrates a digital data sequence f(t) representing an amplitude waveform of a low-frequency signal. Then, the integration circuit 52 outputs the following phase information θ(t) as the integration result.

$$\theta(t) = \int 2\pi f(t) dt$$

The mod $2\pi$ circuit 53 converts the output value of the integration circuit 52 into a value within the range of 0 to $2\pi$. However, if the value range of the integration circuit 52 is designed to be 0 to $2\pi$, the mod $2\pi$ circuit 53 may be omitted.

The rotation operation circuit 54 rotates the I-component data sequence and the Q-component data sequence by using the phase information $\theta(t)$ and by the following calculation. I and Q are input data of the rotation operation circuit 54. I' and Q' are output data of the rotation operation circuit 54.

$$I' = I \cos \theta(t) - Q \sin \theta(t)$$

$$Q' = I \sin \theta(t) + Q \cos \theta(t)$$

Here, rotation operation of the rotation operation circuit 54 corresponds to a process of superimposing a low-frequency signal on a transmission data signal by frequency modulation. Accordingly, the integration circuit 52, the mod $2\pi$ circuit 53, and the rotation operation circuit 54 may operate as the frequency modulation control circuit 22 as illustrated in FIG. 3.

Data I' and data Q' obtained by the rotation operation circuit 54 are respectively converted into an analog signals by the D/A converters 55 and are provided to the optical modulator 56. Then, the optical modulator 56 modulates the continuous wave light output from the light source 21 by the data I' and the data Q' to thereby generate a modulated optical signal. As a result, an optical signal on which a low-frequency signal has been superimposed by a frequency modulation is generated. That is, the optical transmitter 20 generates an optical signal to which a frequency modulation component corresponding to the low-frequency signal has been added.

The light source 21 is, in this example, a frequency tunable laser light source. The oscillation frequency of the light source 21 is controlled by a shift instruction. For example, this shift instruction is provided by the network management system 100 as illustrated in FIG. 3.

FIG. 6 is a diagram for describing frequency modulation. FIG. 6 illustrates the spectrum of an optical signal generated by the optical transmitter 20. The width and shape of the optical spectrum are dependent on the modulation scheme for a main signal data sequence, the modulation rate and the like. In the example illustrated in FIG. 6, the optical frequency of the light source 21 is fc.

At time T0, frequency modulation by a low-frequency signal is not performed. In this case, the center frequency of the optical signal is fc. When frequency modulation by the low-frequency signal is being performed, the center frequency of the optical signal periodically changes between fc$-\Delta$f/2 and fc$+\Delta$f/2, as illustrated in FIG. 6. This cycle is the same as the cycle of the low-frequency signal, and is several kHz to several MHz, for example. Also, the variation width $\Delta$f of the optical frequency is not particularly limited, but is about 100 MHz to 1 GHz, for example.

FIG. 7 illustrates an example of the monitoring apparatus 43. As illustrated in FIG. 7, the monitoring apparatus 43 includes optical filters 61a and 61b, photodetectors (PD) 62a and 62b, amplitude detectors 63a and 63b, an amplitude distribution generator 64, a monitoring unit 65, and a WSS controller 66.

The optical filters 61a and 61b are wavelength tunable optical filters, and the transmission wavelengths thereof are controlled by the amplitude distribution generator 64. The transmission bandwidths of the optical filters 61a and 61b are sufficiently narrow with respect to the spectrum width of each optical signal included in a WDM optical signal. For example, although not particularly limited, the transmission bandwidths of the optical filters 61a and 61b are about 10 GHz. The optical filter 61a filters an input optical signal of the wavelength selective switch 13. An input optical signal of the wavelength selective switch 13 is a WDM optical signal input to the ROADM 1 and/or an optical signal guided from a client via the optical coupler 15. On the other hand, the optical filter 61b filters an output optical signal of the wavelength selective switch 13.

The photodetectors 62a and 62b convert optical signals which have been filtered by the optical filters 61a and 61b, respectively, into electrical signals. Each of the photodetectors 62a and 62b has a bandwidth that can detect the frequency modulation component added to the optical signal.

The amplitude detector 63a detects the amplitude of the frequency modulation component included in the optical signal filtered by the optical filter 61a, based on the electrical signal output from the photodetector 62a. That is, the amplitude detector 63a detects the amplitude of the frequency modulation component included in the optical signal filtered by the optical filter 61a, with respect to the input optical signal of the wavelength selective switch 13. Similarly, the amplitude detector 63b detects the amplitude of the frequency modulation component included in the optical signal filtered by the optical filter 61b, based on the electrical signal output from the photodetector 62b. That is, the amplitude detector 63b detects the amplitude of the frequency modulation component included in the optical signal filtered by the optical filter 61b, with respect to the output optical signal of the wavelength selective switch 13.

Figure 8A:
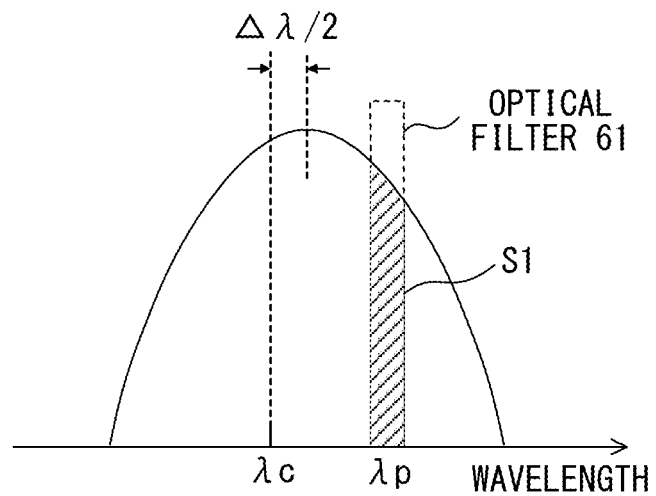
FIGS. 8A and 8B are diagrams for describing a method for monitoring amplitude of a frequency modulation component.
Figure 8B:
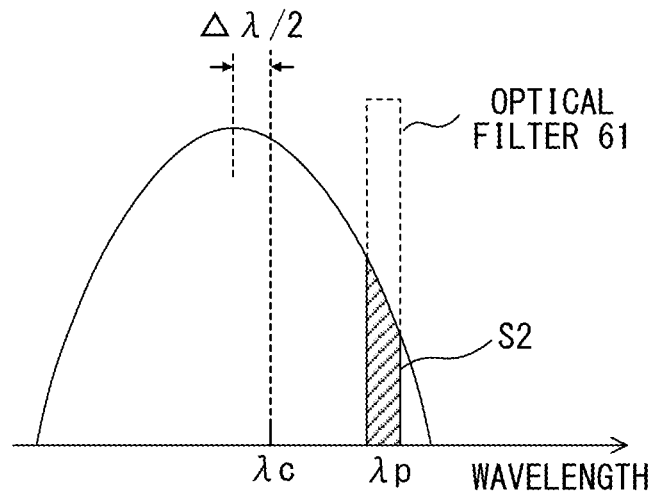

FIGS. 8A and 8B are diagrams for describing a method for detecting the amplitude of a frequency modulation component. Here, the optical wavelength (that is, the center wavelength of an optical signal) corresponding to the oscillation frequency of the light source 21 is assumed to be $\lambda c$. However, the center wavelength of an optical signal periodically changes between $\lambda c - \Delta\lambda/2$ and $\lambda c + \Delta\lambda/2$ based on the frequency modulation component added at the optical transmitter 20. FIG. 8A represents a spectrum where the center wavelength of an optical signal is $\lambda c + \Delta\lambda/2$. FIG. 8B represents a spectrum where the center wavelength of an optical signal is $\lambda c - \Delta\lambda/2$.

The transmission wavelength of the optical filter 61 (61a, 61b) is assumed to be controlled to $\lambda p$. In this case, the power of the optical signal filtered by the optical filter 61 is expressed by the areas of the shaded regions illustrated in FIGS. 8A and 8B. Note that the amplitude detector 63 (63a, 63b) can detect the power of the optical signal filtered by the optical filter 61 based on the electrical signal output from the photodetector 62 (62a, 62b).

The amplitude detector 63 detects the amplitude of the frequency modulation component based on the difference between the maximum value and the minimum value of the power of the optical signal filtered by the optical filter 61, for example. In this example, the power of the optical signal filtered by the optical filter 61 is the maximum when the center wavelength of the optical signal is $\lambda c + \Delta\lambda/2$. Also, the power of the optical signal filtered by the optical filter 61 is the minimum when the center wavelength of the optical signal is $\lambda c - \Delta\lambda/2$. Accordingly, in this case, the difference between the area of a shaded region S1 illustrated in FIG. 8A and the area of a shaded region S2 illustrated in FIG. 8B corresponds to the amplitude of the frequency modulation component.

We will return to FIG. 7. The amplitude distribution generator 64 acquires pieces of amplitude data indicating the amplitude of the frequency modulation components detected by the amplitude detectors 63a and 63b while sweeping the transmission wavelengths of the optical filters 61a and 61b. Then, the amplitude distribution generator 64 generates, with respect to the input optical signal of the wavelength selective switch 13, the distribution of the amplitude of the frequency modulation component (hereinafter, sometimes referred to as an "input-side amplitude distribution") based on the amplitude data acquired from the amplitude detector 63a. Also, the amplitude distribution generator 64 generates, with respect to the output optical signal of the wavelength selective switch 13, the distribution of the amplitude of the frequency modulation component (hereinafter, sometimes referred to as an "output-side amplitude distribution") based on the amplitude data acquired from the amplitude detector 63b.

Figure 9:
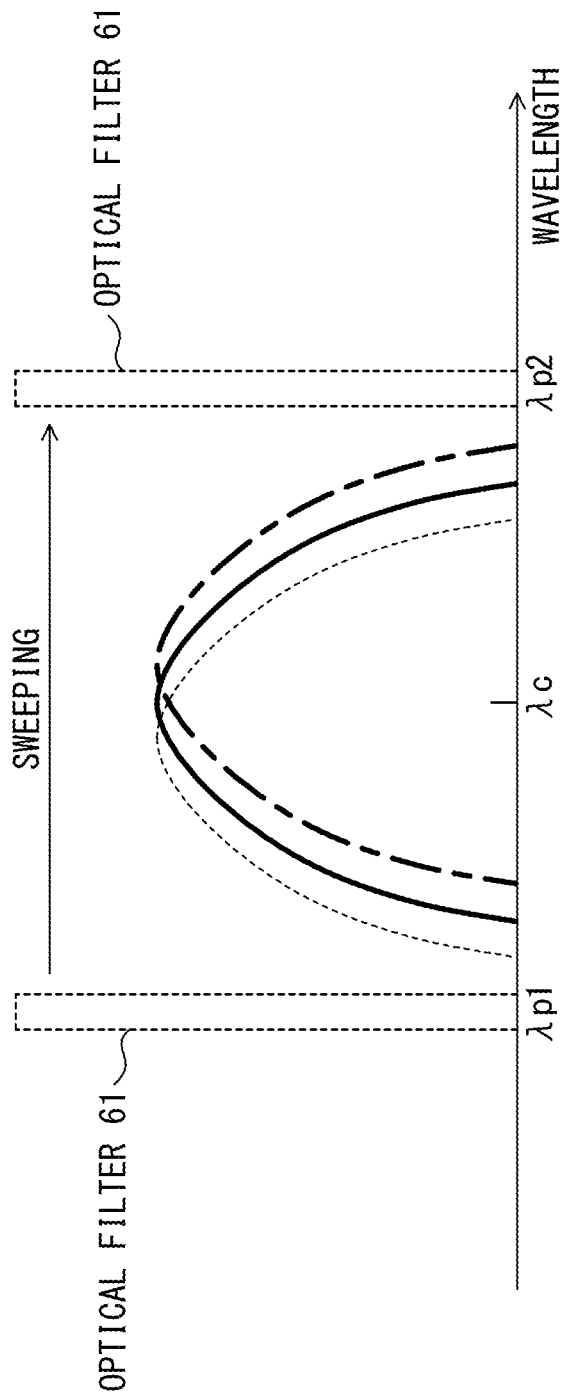
FIG. 9 is a diagram for describing sweeping of a transmission wavelength of an optical filter.

FIG. 9 is a diagram for describing sweeping of the transmission wavelength of the optical filter 61 (61a, 61b). Here, it is assumed that the optical signal at the center wavelength $\lambda c$ is filtered by the optical filter 61. Note that, as described above, the frequency modulation component $\Delta\lambda$ is added to this optical signal at the optical transmitter 20. In FIG. 9, the solid line indicates the spectrum where the frequency modulation component is zero. The dotted line indicates the spectrum where the center wavelength is shifted by $-\Delta\lambda/2$ by frequency modulation. The dashed-dotted line indicates the spectrum where the center wavelength is shifted by $+\Delta\lambda/2$ by frequency modulation.

The amplitude distribution generator 64 sweeps the transmission wavelength of the optical filter 61 across the entire region of the spectrum of the optical signal. In the example illustrated in FIG. 9, the transmission wavelength of the optical filter 61 is swept from $\lambda p1$ to $\lambda p2$. Here, the amplitude distribution generator 64 sweeps the transmission wavelength of the optical filter 61 at a sufficiently low rate compared to the frequency modulation rate. Then, the amplitude distribution generator 64 generates the input-side amplitude distribution and the output-side amplitude distribution between the wavelength $\lambda p1$ to $\lambda p2$ based on the pieces of amplitude data acquired from the amplitude detectors 63a and 63b.

At this time, for example, the amplitude distribution generator 64 detects the amplitude of the frequency modulation component for each of a plurality of measurement wavelengths in the region between the wavelength $\lambda p1$ and the wavelength $\lambda p2$. In this case, the detection time for detecting the amplitude of the frequency modulation component for each measurement wavelength is set to be longer than the cycle of the low-frequency signal used for frequency modulation. Additionally, the number of measurement wavelengths set between the wavelength $\lambda p1$ and the wavelength $\lambda p2$ is not particularly limited. Also, the amplitude distribution generator 64 may detect the amplitude of the frequency modulation component while continuously changing the measurement wavelength in the region between the wavelength $\lambda p1$ and the wavelength $\lambda p2$.

FIG. 10 is a diagram for describing a method for generating an amplitude distribution of a frequency modulation component. Here, it is assumed that the amplitude of the frequency modulation component is detected for each of transmission wavelengths $\lambda 1$, $\lambda 2$, and $\lambda 3$ of the optical filter 61.

Timings of detection of the power of the optical signal filtered by the optical filter 61 are indicated by T1, T2, T3, T4, and T5. At T1, T3, and T5, the center wavelength of the optical signal is $\lambda c$. At T2, the center wavelength of the optical signal is $\lambda c+\Delta\lambda/2$. At T4, the center wavelength of the optical signal is $\lambda c-\Delta\lambda/2$. The time period T1 to T5 corresponds to the cycle of the low-frequency signal used for frequency modulation.

That is, FIG. 10 illustrates, with respect to T1 to T5, the spectrum of the optical signal and of the arrangement of the transmission wavelength band of the optical filter 61. Also, FIG. 10 illustrates the power of the optical signal filtered by the optical filter 61 at each of T1 to T5, with respect to the transmission wavelengths $\lambda 1$, $\lambda 2$, and $\lambda 3$ of the optical filter 61.

When the transmission wavelength band of the optical filter 61 is arranged in a wavelength region where the tilt of the spectrum of the optical signal is small, the variation in the power of the output optical signal of the optical filter 61 is small relative to the variation in the center wavelength of the optical signal. In the example illustrated in FIG. 10, when the transmission wavelength of the optical filter 61 is controlled to $\lambda 1$, the variation in the power of the output optical signal of the optical filter 61 is small. For example, when compared to T1, T3, and T5, the optical power detected at T2 is slightly greater, and the optical power detected at T4 is slightly less. Here, the variation in the optical power at T1 to T5 is due to the frequency modulation component added to the optical signal at the optical transmitter 20. Accordingly, the amplitude of the frequency modulation component where the transmission wavelength of the optical filter 61 is controlled to $\lambda 1$ is A1, as illustrated in FIG. 10.

When the transmission wavelength band of the optical filter 61 is arranged in a wavelength region where the tilt of the spectrum of the optical signal is great, the variation in the power of the output optical signal of the optical filter 61 is great relative to the variation in the center wavelength of the optical signal. In the example illustrated in FIG. 10, when the transmission wavelength of the optical filter 61 is controlled to $\lambda 2$, the variation in the power of the output optical signal of the optical filter 61 is great compared to when the transmission wavelength of the optical filter 61 is controlled to $\lambda 1$. As a result, the amplitude of the frequency modulation component where the transmission wavelength of the optical filter 61 is controlled to $\lambda 2$ is A2, as illustrated in FIG. 10. Note that, the amplitude A2 is greater than the amplitude A1.

When the transmission wavelength band of the optical filter 61 is arranged in a wavelength region where the tilt of the spectrum of the optical signal is further greater, the variation in the power of the output optical signal of the optical filter 61 is much greater relative to the variation in the center wavelength of the optical signal. In the example illustrated in FIG. 10, when the transmission wavelength of the optical filter 61 is controlled to $\lambda 3$, the variation in the power of the output optical signal of the optical filter 61 is much greater compared to when the transmission wavelength of the optical filter 61 is controlled to $\lambda 2$. As a result, the amplitude of the frequency modulation component where the transmission wavelength of the optical filter 61 is controlled to $\lambda 3$ is A3, as illustrated in FIG. 10. Note that, the amplitude A3 is greater than the amplitude A2.

The amplitude distribution generator 64 generates a distribution of the amplitude of the frequency modulation component based the amplitude data acquired from the amplitude detector 63. At this time, the amplitude distribution generator 64 generates an input-side amplitude distribution based on the amplitude data acquired from the amplitude detector 63a, and generates an output-side amplitude distribution based on the amplitude data acquired from the amplitude detector 63b.

Figure 11A:
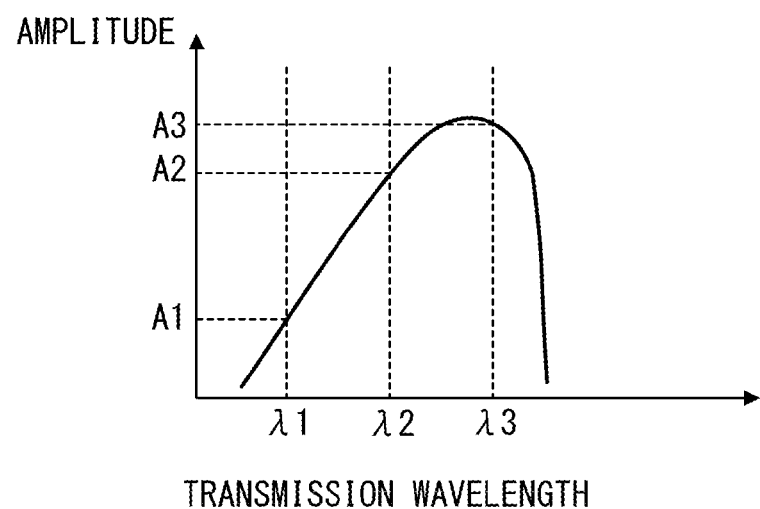
FIGS. 11A and 11B illustrate examples of an amplitude distribution of a frequency modulation component.

FIG. 11A illustrates an example of an amplitude distribution generated based on amplitude detection illustrated in FIG. 10. In this example, when the transmission wavelength of the optical filter 61 becomes greater from $\lambda 1$ toward $\lambda 3$, the amplitude of the frequency modulation component also becomes greater. Then, when the transmission wavelength of the optical filter 61 becomes greater than $\lambda 3$, the amplitude of the frequency modulation component drastically becomes small.

We will return to FIG. 7. The monitoring unit 65 monitors whether the transmission wavelength band of the wavelength tunable optical filter of the wavelength selective switch 13 with respect to the spectrum of the optical signal is appropriately controlled or not, based on the distribution of the amplitude of the frequency modulation component generated by the amplitude distribution generator 64. At this time, the monitoring unit 65 monitors whether the transmission wavelength band of the wavelength tunable optical filter is appropriately controlled or not, by using both the input-side wavelength distribution and the output-side wavelength distribution. However, the monitoring unit 65 may also monitor whether the transmission wavelength band of the wavelength tunable optical filter is appropriately controlled or not, by using the output-side wavelength distribution without using the input-side wavelength distribution.

The WSS controller 66 controls the transmission wavelength band of the wavelength tunable optical filter of the wavelength selective switch 13 based on the monitoring result of the monitoring unit 65. For example, in the case the transmission wavelength band of the wavelength tunable optical filter of the wavelength selective switch 13 is not appropriately controlled, the WSS controller 66 generates a control signal for widening the transmission wavelength band of the wavelength tunable optical filter, and provides the control signal to the wavelength selective switch 13.

The amplitude distribution generator 64, the monitoring unit 65, and the WSS controller 66 are realized by a processor system, for example. In this case, the processor system includes a processor element and a memory, and executes programs in which the functions described above are written. The programs are stored in the memory in the processor system, for example. However, it is also possible to realize the amplitude distribution generator 64, the monitoring unit 65, and the WSS controller 66 by a combination of the processor system and a hardware circuit. Also, the amplitude detector 63 (63a, 63b) may be realized by a hardware circuit, or by the processor system described above.

FIGS. 12A and 12B are diagrams for describing a case where the transmission wavelength band of the filter is appropriately controlled and a case where it is not appropriately controlled. A spectrum SP1 indicates an optical signal input to the wavelength selective switch 13. A spectrum SP2 indicates an optical signal output from the wavelength selective switch 13. The wavelength tunable optical filter of the wavelength selective switch 13 has a transmission wavelength band F.

FIG. 12A illustrates filtering where the transmission wavelength band F is appropriately controlled. In this case, the "transmission wavelength band F is appropriately controlled" means that the spectrum of the optical signal is arranged substantially within the transmission wavelength band F. Accordingly, in this case, the shape of the spectrum SP2 of the output optical signal is substantially the same as the spectrum SP1 of the input optical signal.

FIG. 12B illustrates filtering where the transmission wavelength band F is not appropriately controlled. In the example illustrated in FIG. 12B, the longer wavelength side of the transmission wavelength band F is not sufficiently secured for the spectrum SP1 of the optical signal. Thus, apart of the spectrum of the optical signal is removed at the wavelength selective switch 13. As a result, a part on the longer wavelength side of the spectrum SP2 of the output optical signal is removed.

Figure 13:
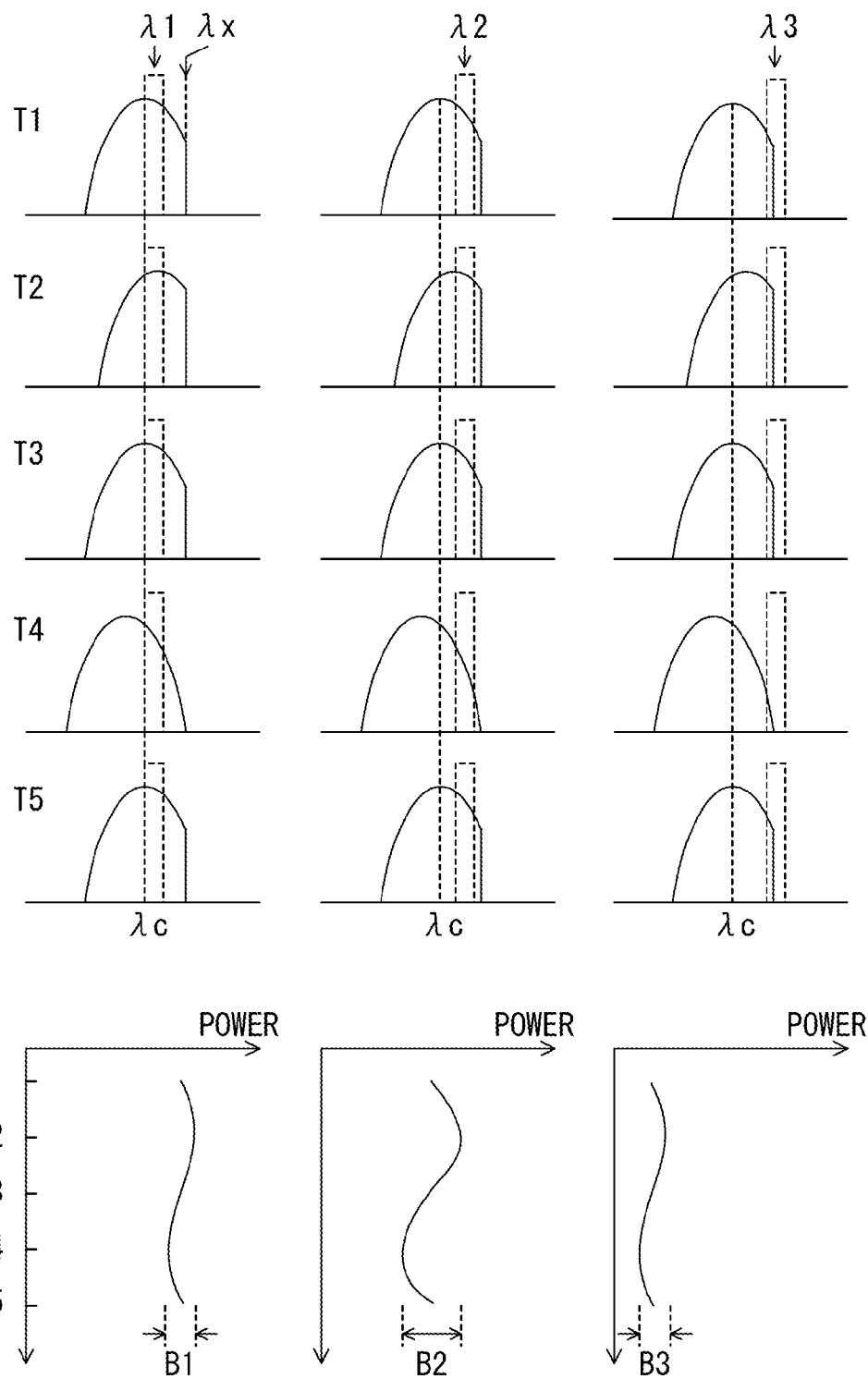
FIG. 13 is a diagram for describing a method for generating an amplitude distribution for an optical signal a part of whose spectrum has been removed.

FIG. 13 is a diagram for describing a method for generating an amplitude distribution of a frequency modulation component for an optical signal a part of whose spectrum has been removed. Here, it is assumed that a part on the longer wavelength side of the spectrum of an optical signal is removed by the wavelength tunable optical filter of the wavelength selective switch 13, as in the example illustrated in FIG. 12B. Additionally, in the example illustrated in FIG. 13, it is assumed that the cut-off wavelength on the longer wavelength side of the wavelength tunable optical filter of the wavelength selective switch 13 is controlled to $\lambda x$ by mistake.

The transmission wavelength $\lambda 1$ of the optical filter 61 of the monitoring apparatus 43 is shorter than the cut-off wavelength $\lambda x$ of the wavelength tunable optical filter of the wavelength selective switch 13. Accordingly, when the transmission wavelength of the optical filter 61 is $\lambda 1$, the optical signals output from the optical filter 61 are substantially the same in the examples illustrated in FIGS. 12A and 12B. That is, when the transmission wavelength of the optical filter 61 is $\lambda 1$, amplitude B1 obtained in FIG. 13 is substantially the same as the amplitude A1 obtained in FIG. 10.

Similarly, the transmission wavelength $\lambda 2$ of the optical filter 61 of the monitoring apparatus 43 is also shorter than the cut-off wavelength $\lambda x$ of the wavelength tunable optical filter of the wavelength selective switch 13. Accordingly, also when the transmission wavelength of the optical filter 61 is $\lambda 2$, amplitude B2 obtained in FIG. 13 is substantially the same as the amplitude A2 obtained in FIG. 10.

However, when the transmission wavelength of the optical filter 61 is $\lambda 3$, a part of the wavelength components of the optical signal existing in the transmission wavelength band of the optical filter 61 is removed by the wavelength selective switch 13. Thus, when the transmission wavelength of the optical filter 61 is $\lambda 3$, amplitude B3 obtained in FIG. 13 is smaller than the amplitude A3 obtained in FIG. 10.

Figure 11B:
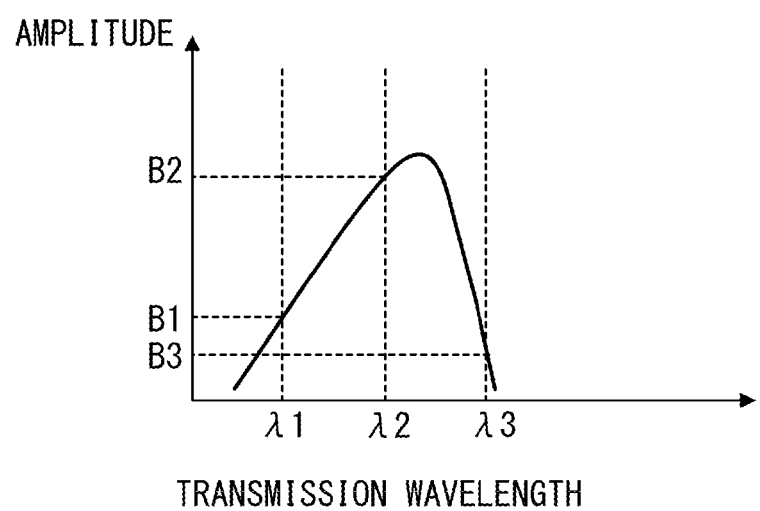

FIG. 11B illustrates an example of the amplitude distribution generated based on the amplitude detection illustrated in FIG. 13. In the example illustrated in FIG. 11A, when the transmission wavelength of the optical filter 61 becomes greater from $\lambda 1$ toward $\lambda 3$, the amplitude of the frequency modulation component also becomes greater. That is, A1<A2<A3 is true. On the other hand, according to the distribution illustrated in FIG. 11B, the amplitude B2 obtained with respect to the transmission wavelength $\lambda 2$ is greater than the amplitude B1 obtained with respect to the transmission wavelength $\lambda 1$, but the amplitude B3 obtained with respect to the transmission wavelength $\lambda 3$ is smaller than the amplitude B2 obtained with respect to the transmission wavelength $\lambda 2$. That is, B1<B2 and B2>B3 are obtained.

As described above, the amplitude distribution of when the transmission wavelength of the wavelength tunable optical filter of the wavelength selective switch 13 is not appropriately controlled with respect to the spectrum of an optical signal is different from the amplitude distribution of when the transmission wavelength is appropriately controlled with respect to the spectrum of the optical signal. Accordingly, the monitoring apparatus 43 may determine whether the transmission wavelength of the wavelength tunable optical filter of the wavelength selective switch 13 is appropriately controlled with respect to the spectrum of an optical signal, by acquiring the amplitude distribution of the frequency modulation component for the optical signal output from the wavelength selective switch 13.

The monitoring apparatus 43 of the embodiment decides whether the transmission wavelength band of the wavelength tunable optical filter of the wavelength selective switch 13 is appropriately controlled, as illustrated in FIG. 12A, or is not appropriately controlled, as illustrated in FIG. 12B. This decision is performed by using the amplitude distribution of the frequency modulation component described above. According to one example, the monitoring apparatus 43 decides whether the transmission wavelength band of the wavelength tunable optical filter of the wavelength selective switch 13 is appropriately controlled with respect to the spectrum of an optical signal, by comparing the shape of the input-side amplitude distribution and the shape of the output-side amplitude distribution. For example, it is assumed that FIGS. 11A and 11B represent the input-side amplitude distribution and the output-side amplitude distribution, respectively. In this case, with respect to the wavelengths $\lambda 1$, $\lambda 2$, and $\lambda 3$, $A1<A2<A3$ is indicated by the input-side amplitude distribution, and $B1<B2$ and $B2>B3$ are indicated by the output-side amplitude distribution. In this case, the shapes of the two amplitude distributions are determined to be different, and it is decides that the transmission wavelength band of the wavelength tunable optical filter of the wavelength selective switch 13 is not appropriately controlled with respect to the spectrum of the optical signal.

FIG. 14A illustrates an example of a wavelength distribution that is obtained when the transmission wavelength band of the wavelength selective switch 13 is appropriately controlled. When the transmission wavelength band of the wavelength selective switch 13 is appropriately controlled, the shape of the spectrum SP2 of the output optical signal is substantially the same as the spectrum SP1 of the input optical signal, as illustrated in FIG. 12A. Accordingly, in this case, the input-side wavelength distribution and the output-side wavelength distribution generated by the monitoring apparatus 43 are similar to each other, as illustrated in FIG. 14A. Note that "distributions are similar to each other" means that the shapes or the patterns of the distributions are similar to each other, and the amplitude values do not have to be approximate to each other.

Here, the input-side amplitude distribution indicates the amplitude distribution obtained with respect to the optical signal input to the wavelength selective switch 13. Thus, the input-side amplitude distribution may be used as a reference amplitude distribution for deciding whether the transmission wavelength band of the wavelength selective switch 13 is appropriately controlled. Accordingly, when the input-side wavelength distribution and the output-side wavelength distribution are similar to each other, the monitoring unit 65 decides that the transmission wavelength band of the wavelength selective switch 13 is appropriately controlled. Note that the monitoring unit 65 may also detect the degree of similarity between the input-side wavelength distribution and the output-side wavelength distribution by calculating the correlation of the input-side wavelength distribution and the output-side wavelength distribution, for example.

FIG. 14B illustrates an example of a wavelength distribution that is obtained when the transmission wavelength band of the wavelength selective switch 13 is not appropriately controlled. When the transmission wavelength band of the wavelength selective switch 13 is not appropriately controlled, the shape of the spectrum SP2 of the output optical signal is different from the spectrum SP1 of the input optical signal, as illustrated in FIG. 12B. Accordingly, in this case, the input-side wavelength distribution and the output-side wavelength distribution generated by the monitoring apparatus 43 are not similar to each other, as illustrated in FIG. 14B.

In the example illustrated in FIG. 14B, since the transmission wavelength band of the wavelength selective switch 13 is not appropriately controlled, a part of the spectrum of the optical signal on the longer wavelength side is removed at the wavelength selective switch 13. Accordingly, the input-side wavelength distribution and the output-side wavelength distribution are not similar to each other on the longer wavelength side of the spectrum of the optical signal. In this case, the monitoring unit 65 outputs a monitoring result signal indicating that the transmission wavelength band of the wavelength selective switch 13 is not appropriately controlled. In addition, the monitoring unit 65 may output a monitoring result signal indicating that the transmission wavelength band is not appropriately controlled with respect to the longer wavelength side of the spectrum of the optical signal.

The WSS controller 66 controls the transmission wavelength band of the wavelength tunable optical filter of the wavelength selective switch 13 based on the monitoring result by the monitoring unit 65. For example, when a monitoring result signal indicating that the transmission wavelength band is not appropriately controlled with respect to the longer wavelength side of the spectrum of the optical signal is received from the monitoring unit 65, the WSS controller 66 generates a control signal for widening the transmission wavelength band of the wavelength tunable optical filter on the longer wavelength side, and provides the control signal to the wavelength selective switch 13. By so doing, the wavelength selective switch 13 widens the transmission wavelength band on the longer wavelength side according to the control signal, and thus, the spectrum of the optical signal is not removed at the wavelength selective switch 13.

Figure 15:
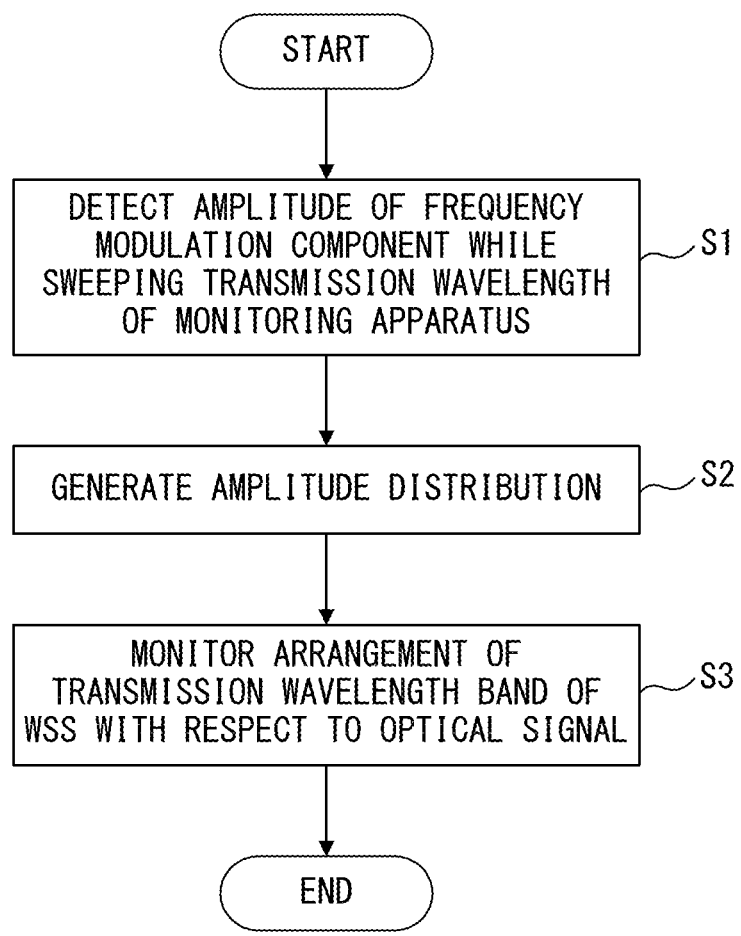
FIG. 15 is a flow chart illustrating a monitoring method of an embodiment.

FIG. 15 is a flow chart illustrating a monitoring method of the embodiment. The process of the flow chart is performed by the monitoring apparatus 43. For example, the monitoring apparatus 43 performs the process of the flowchart illustrated in FIG. 15 according to an instruction from the network management system 100 when wavelength defragmentation illustrated in FIGS. 2A, 2B, and 4 is performed. Additionally, it is assumed that a frequency modulation component is added at the optical transmitter 20 to the optical signal input to the wavelength selective switch 13.

In S1, the monitoring apparatus 43 detects the amplitude of a frequency modulation component while sweeping the transmission wavelength of the optical filter of the monitoring apparatus 43. At this time, the amplitude distribution generator 64 sweeps the transmission wavelength of the optical filter 61 (61a, 61b). Then, the amplitude detector 63 (63a, 63b) detects the amplitude of the frequency modulation component for each of a plurality of transmission wavelengths.

In S2, the monitoring apparatus 43 generates a distribution of the amplitude of the frequency modulation component based on the detection result of the amplitude detector 63 (63a, 63b). The amplitude distribution is generated by plotting the amplitude of the frequency modulation component with respect to the transmission wavelength of the optical filter 61, for example. At this time, the amplitude distribution generator 64 generates an input-side amplitude distribution and an output-side amplitude distribution. Note that the monitoring apparatus 43 may generate the input-side amplitude distribution and the output-side amplitude distribution substantially in parallel.

In S3, the monitoring apparatus 43 monitors the arrangement of the transmission wavelength band of the wavelength selective switch 13 with respect to the optical signal based on the amplitude distributions generated by the amplitude distribution generator 64. The "arrangement of the transmission wavelength band" is not particularly limited, but may be expressed by the cut-off wavelength on the shorter wavelength side and the cut-off wavelength on the longer wavelength side of the transmission wavelength band, for example. At this time, the monitoring unit 65 decides whether the transmission wavelength band of the wavelength selective switch 13 is appropriately controlled with respect to the optical signal (or whether it is appropriately arranged), by comparing the input-side amplitude distribution and the output-side amplitude distribution.

As described above, the monitoring apparatus 43 of the embodiment is capable of deciding whether the transmission wavelength band of the wavelength tunable optical filter of the wavelength selective switch 13 is appropriately controlled with respect to an optical signal, by using the distribution of the amplitude of the frequency modulation component added to the optical signal. Here, the monitoring method of the embodiment is expected to be capable of more accurately detecting a change in the spectrum of an optical signal compared to a method of directly monitoring the shape of the spectrum of an optical signal, and thus, whether the transmission wavelength band is appropriately controlled or not may be accurately decided.

<Other Embodiments>

In the example described above, the monitoring apparatus 43 decides whether the transmission wavelength band is appropriately controlled or not, by comparing the input-side amplitude distribution and the output-side amplitude distribution. However, the present invention is not limited to this configuration. For example, in the case the wavelength distribution (a reference wavelength distribution) obtained with respect to an optical signal input to the wavelength selective switch 13 is obtained in advance by simulation or the like, the monitoring apparatus 43 may decide whether the transmission wavelength band is appropriately controlled or not, by comparing the reference amplitude distribution and the output-side amplitude distribution. In addition, in the case the wavelength distribution (a reference wavelength distribution) that is obtained with respect to an optical signal output from the wavelength selective switch 13 when the transmission wavelength band of the wavelength selective switch 13 is appropriately controlled is obtained in advance by simulation or the like, the monitoring apparatus 43 may decide whether the transmission wavelength band is appropriately controlled or not, by comparing the reference amplitude distribution and the output-side amplitude distribution.

The shape of the spectrum of an optical signal is substantially symmetric with respect to the center wavelength (or the center frequency). Therefore, the monitoring apparatus 43 may also decide whether the transmission wavelength band is appropriately controlled or not, based on the symmetry of the output-side amplitude distribution, without using the input-side amplitude distribution or the reference amplitude distribution. For example, if the output-side amplitude distribution is symmetric with respect to the center wavelength of the optical signal, as illustrated in FIG. 14A, it is decided that the transmission wavelength band is appropriately controlled with respect to the optical signal. On the other hand, if the output-side amplitude distribution is asymmetric with respect to the center wavelength of the optical signal, as illustrated in FIG. 14B, it is decided that the transmission wavelength band is not appropriately controlled with respect to the optical signal.

In the case where the input-side amplitude distribution is not used for the decision, the monitoring apparatus 43 does not have to include the optical filter 61a, the photodetector 62a, and the amplitude detector 63a. In this case, the configuration of the monitoring apparatus 43 is simplified.

Also, in the example described above, the transmission wavelengths of the optical filters 61a and 61b are swept across the entire range of the spectra of the optical signals, but the present invention is not limited to this configuration. For example, the monitoring apparatus 43 may decide whether the transmission wavelength band of the wavelength selective switch 13 is appropriately controlled on the longer wavelength side of the optical signal, by sweeping the transmission wavelengths of the optical filters 61a and 61b from the centers of the spectra of the optical signals to the edges on the longer wavelength sides. Similarly, the monitoring apparatus 43 may decide whether the transmission wavelength band of the wavelength selective switch 13 is appropriately controlled on the shorter wavelength side of the optical signal, by sweeping the transmission wavelengths of the optical filters 61a and 61b from the centers of the spectra of the optical signals to the edges on the shorter wavelength sides.

<Wavelength Defragmentation>

Figure 16:
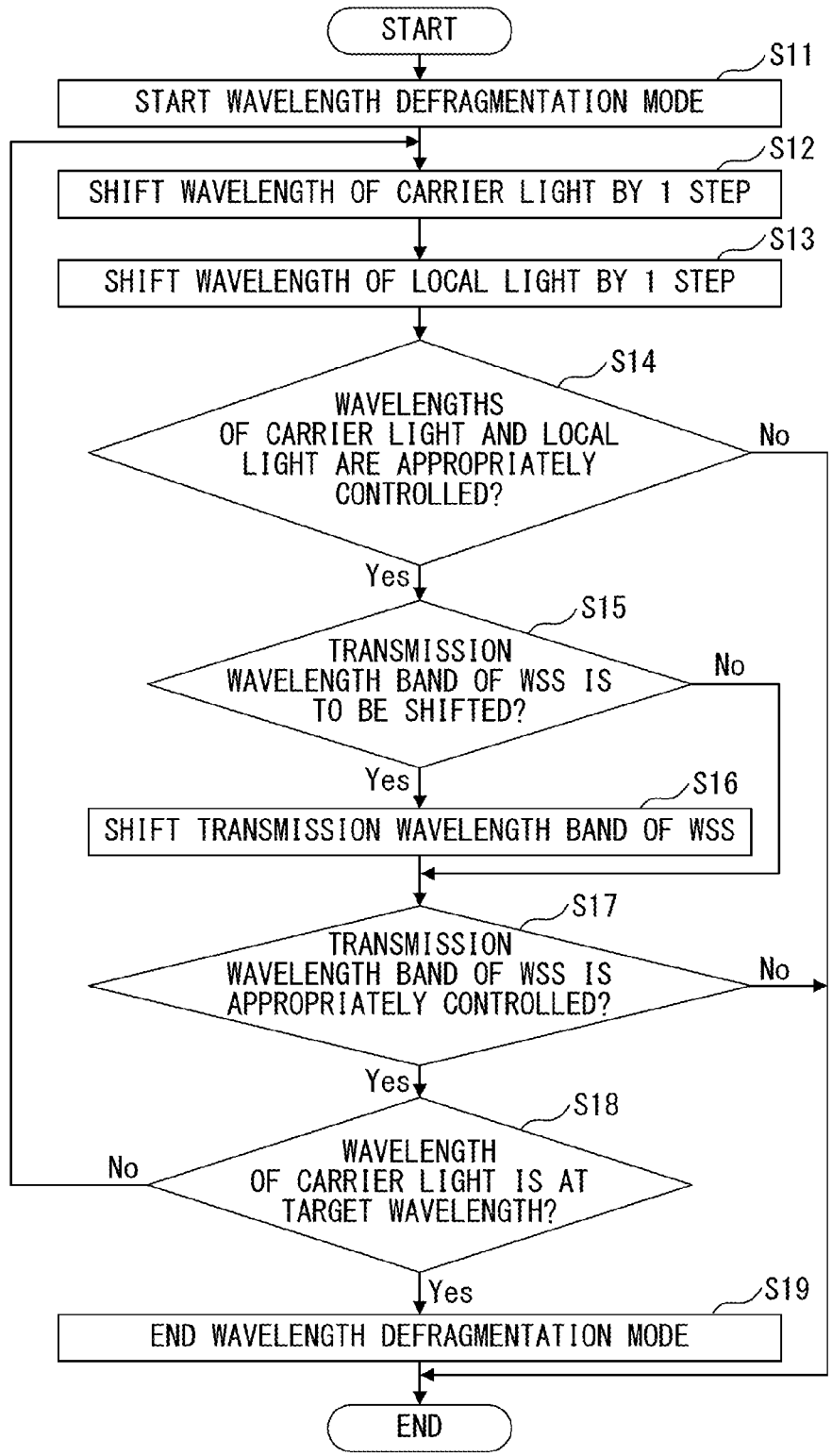
FIG. 16 is a flow chart illustrating a procedure of wavelength defragmentation.

FIG. 16 is a flow chart illustrating a procedure of wavelength defragmentation. Here, it is assumed that, in the WDM transmission system, the center wavelength of an optical signal transmitted via one optical path is to be shifted from the current wavelength to a target wavelength. Additionally, wavelength defragmentation is performed without interrupting the communication in the target optical path.

In the description below, it is assumed that the optical transmitter 20 is capable of adjusting the wavelength of the light source 21 by 10 pm at a time. Also, it is assumed that the optical receiver 30 is capable of adjusting the wavelength of the local oscillation light source 31 by 10 pm at a time. In addition, it is assumed that the wavelength selective switch 13 is capable of adjusting the transmission wavelength band of the wavelength tunable optical filter by 0.1 nm at a time. That is, the slot width of the flexible grid is 0.1 nm. Here, it is assumed that the wavelength selective switch 13 is capable of separately adjusting the cut-off wavelength on the longer wavelength side of the transmission wavelength band of the wavelength tunable optical filter and the cut-off wavelength on the shorter wavelength side of the transmission wavelength band.

In S11, the network management system 100 instructs the ROADM 1 on an optical path which is the target of wavelength defragmentation to start wavelength defragmentation. In the example illustrated in FIG. 3, wavelength defragmentation is performed on an optical path for transmitting an optical signal from the optical transmitter (Tx1) 20 of the ROADM #1 to the optical receiver (Rx1) 30 of the ROADM #3. In this case, a wavelength defragmentation start instruction is provided to the ROADMs #1 and #2. Moreover, the wavelength defragmentation start instruction includes information indicating the target wavelength. In the example illustrated in FIG. 4, the wavelength defragmentation start instruction includes "target wavelength=$\lambda 3$". Additionally, the ROADM 1, which has received the wavelength defragmentation start instruction, desirably widens the transmission wavelength band of the wavelength selective switch 13 by one slot toward the direction of shifting of the wavelength according to the wavelength defragmentation.

In the following description, the "optical transmitter 20" indicates the optical transmitter that generates an optical signal that is to be transmitted via the optical path which is the target of wavelength defragmentation. The "optical receiver 30" indicates the optical receiver that receives the optical signal that is transmitted via the optical path which is the target of wavelength defragmentation. The "ROADM 1" is the ROADM that is provided on the optical path which is the target of wavelength defragmentation. The "carrier light" indicates the light that propagates the signal transmitted from the optical transmitter 20.

In S12, the network management system 100 provides a shift instruction to the optical transmitter 20 to shift the wavelength of the carrier light by one step toward the target wavelength. When this instruction is received, the optical transmitter 20 shifts the wavelength of the light source 21 by $\Delta\lambda_{step}$. In this example, $\Delta\lambda_{step}$ is 10 pm.

In S13, the network management system 100 provides a shift instruction to the optical receiver 30 to shift the wavelength of the local oscillation light by one step toward the target wavelength. When this instruction is received, the optical receiver 30 shifts the wavelength of the local oscillation light source 31 by $\Delta\lambda_{step}$. Note that S12 and S13 may be performed substantially in parallel.

In S14, whether the wavelength of the carrier light and the wavelength of the local oscillation light are appropriately controlled is decided. This decision is performed by the optical receiver 30, for example. For example, if the difference between the frequency of the carrier light and the frequency of the local oscillation light (that is, the frequency offset) is smaller than a specified threshold, the optical receiver 30 decides that the wavelength of the carrier light and the wavelength of the local oscillation light are appropriately controlled. If the carrier light and the local oscillation light are appropriately controlled, the process of wavelength defragmentation proceeds to S15. On the other hand, if the carrier light and the local oscillation light are not appropriately controlled, the process of wavelength defragmentation is ended. The decision result of S14 is transmitted to the network management system 100.

In S15, the network management system 100 decides whether or not to shift the transmission wavelength band of the wavelength selective switch 13 of the ROADM 1. In this example, the wavelength step $\Delta\lambda_{step}$ for adjusting the wavelength of the carrier light is 10 pm. On the other hand, the slot width for adjusting the transmission wavelength band of the wavelength selective switch 13 is 0.1 nm. Accordingly, if control is performed such that the transmission wavelength band of the wavelength selective switch 13 is shifted by one slot every time wavelength shifting of the carrier light has been performed ten times, the spectrum of the optical signal will continue to be arranged within the transmission wavelength band of the wavelength selective switch 13. Thus, the network management system 100 performs S16 once every time S12 to S18 have been performed ten times.

In S16, the network management system 100 issues an instruction to shift the transmission wavelength band of the wavelength selective switch 13 to the ROADM 1. By so doing, the ROADM 1 shifts the transmission wavelength band of the wavelength selective switch 13 by one slot toward the target wavelength. In this case, the cut-off wavelength on the longer wavelength side and the cut-off wavelength on the shorter wavelength side of the transmission wavelength band are respectively shifted by one slot.

In S17, the monitoring apparatus 43 of the ROADM 1 decides whether the transmission wavelength band of the wavelength selective switch 13 is appropriately controlled with respect to the spectrum of the optical signal. This decision is realized by the configuration and the method described with reference to FIGS. 7-14B. Then, when the transmission wavelength band of the wavelength selective switch 13 is appropriately controlled, the process of wavelength defragmentation proceeds to S18. On the other hand, when the transmission wavelength band of the wavelength selective switch 13 is not appropriately controlled, the process of wavelength defragmentation is ended. However, when the transmission wavelength band of the wavelength selective switch 13 is not appropriately controlled, the WSS controller 66 may widen the transmission wavelength band so that "Yes" will be obtained in the decision in S17. In this case, the network management system 100 may continue the wavelength defragmentation process.

In S18, the network management system 100 decides whether or not the wavelength of the carrier light has reached the target wavelength. If the wavelength of the carrier light is at the target wavelength, the process of wavelength defragmentation proceeds to S19. On the other hand, if the wavelength of the carrier light has not reached the target wavelength, the process of wavelength defragmentation returns to S12. That is, S12 to S18 are repeatedly performed until the wavelength of the carrier light has reached the target wavelength.

In S19, the network management system 100 instructs the ROADM 1 to end the wavelength defragmentation. If the transmission wavelength band of the wavelength selective switch 13 has been widened in S11, the ROADM 1 returns the width of the transmission wavelength band to the original state in S19. For example, in the example illustrated in FIG. 4, the target wavelength (that is, $\lambda 3$) is longer than the wavelength of the carrier light at the start of wavelength defragmentation (that is, $\lambda 1$). In this case, in S11, the ROADM 1 widens the longer wavelength side of the transmission wavelength band of the wavelength selective switch 13 by one slot. Then, in S19, the ROADM 1 narrows the shorter wavelength side of the transmission wavelength band by one slot.

As described, in the wavelength defragmentation of the embodiment, whether the transmission wavelength band of the wavelength selective switch 13 is appropriately controlled with respect to the spectrum of the optical signal is monitored every time the wavelength of the carrier light and/or the transmission wavelength of the wavelength selective switch 13 is adjusted. Accordingly, wavelength defragmentation may be stopped before the quality of the optical signal is greatly reduced. Thus, communication is not interrupted by wavelength defragmentation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A monitoring apparatus that monitors a wavelength tunable optical filter for filtering a wavelength division multiplexing (WDM) optical signal, each of a plurality of optical signals multiplexed in the WDM optical signal carrying a data signal and a low-frequency signal, the low-frequency signal being superimposed on a corresponding optical signal in the plurality of optical signals by frequency modulation, the monitoring apparatus comprising:
    an optical filter configured to filter a first optical signal output from the wavelength tunable optical filter;
    a photodetector configured to convert a second optical signal output from the optical filter into an electric signal;
    a detector configured to detect amplitude of the frequency modulation component included in the second optical signal output from the optical filter by detecting amplitude of intensity of the electric signal output from the photodetector;

a generator configured to generate an output-side amplitude distribution representing a distribution of the amplitude of the frequency modulation component detected by the detector; and a monitoring unit configured to monitor arrangement of a transmission wavelength band of the wavelength tunable optical filter, wherein a width of a transmission wavelength band of the optical filter is narrower than a width of a spectrum of one optical signal multiplexed in the WDM optical signal, when the wavelength tunable optical filter filters the WDM optical signal so as to pass a target optical signal among the plurality of optical signals multiplexed in the WDM optical signal, the generator sweeps a transmission wavelength of the optical filter for a wavelength range where a spectrum of the target optical signal exists to generate the output-side amplitude distribution representing the distribution of the amplitude of the frequency modulation component for the wavelength range where the spectrum of the target optical signal exists, and the monitoring unit monitors the arrangement of the transmission wavelength band of the wavelength tunable optical filter with respect to a spectrum of the target optical signal based on the output-side amplitude distribution generated by the generator.

2. The monitoring apparatus according to claim 1, wherein the monitoring unit decides whether the transmission wavelength band of the wavelength tunable optical filter is appropriately controlled with respect to the spectrum of the target optical signal, based on comparison of the output-side amplitude distribution and a reference distribution that is generated in advance.

3. A monitoring apparatus that monitors a wavelength tunable optical filter for filtering a wavelength division multiplexing (WDM) optical signal to which a frequency modulation component is added, the monitoring apparatus comprising:

a first optical filter configured to filter a first optical signal output from the wavelength tunable optical filter;

a first detector configured to detect amplitude of the frequency modulation component included in a second optical signal output from the first optical filter;

a generator configured to generate an output-side amplitude distribution representing a distribution of the amplitude of the frequency modulation component detected by the first detector, by sweeping a transmission wavelength of the first optical filter;

a monitoring unit configured to monitor arrangement of a transmission wavelength band of the wavelength tunable optical filter with respect to a spectrum of the first optical signal based on the output-side amplitude distribution generated by the generator;

a second optical filter configured to filter the WDM optical signal at an input side of the wavelength tunable optical filter; and a second detector configured to detect amplitude of the frequency modulation component included in a third optical signal output from the second optical filter, wherein the generator further generates an input-side amplitude distribution representing a distribution of the amplitude of the frequency modulation component detected by the second detector, by sweeping a transmission wavelength of the second optical filter, and wherein the monitoring unit decides whether the transmission wavelength band of the wavelength tunable optical filter is appropriately controlled with respect to the spectrum of the first optical signal, based on comparison of the input-side amplitude distribution and the output-side amplitude distribution.

4. A monitoring apparatus that monitors a wavelength tunable optical filter for filtering a wavelength division multiplexing (WDM) optical signal to which a frequency modulation component is added, the monitoring apparatus comprising:

an optical filter configured to filter a first optical signal output from the wavelength tunable optical filter;

a detector configured to detect amplitude of the frequency modulation component included in a second optical signal output from the optical filter;

a generator configured to generate an output-side amplitude distribution representing a distribution of the amplitude of the frequency modulation component detected by the detector, by sweeping a transmission wavelength of the optical filter; and a monitoring unit configured to monitor arrangement of a transmission wavelength band of the wavelength tunable optical filter with respect to a spectrum of the first optical signal based on the output-side amplitude distribution generated by the generator, wherein the monitoring unit decides whether the transmission wavelength band of the wavelength tunable optical filter is appropriately controlled with respect to the spectrum of the first optical signal, based on symmetry of the output-side amplitude distribution.

5. A monitoring method that monitors a wavelength tunable optical filter for filtering a wavelength division multiplexing (WDM) optical signal, each of a plurality of optical signals multiplexed in the WDM optical signal carrying a data signal and a low-frequency signal, the low-frequency signal being superimposed on a corresponding optical signal in the plurality of optical signals by frequency modulation, the monitoring method comprising:

sweeping a transmission wavelength of an optical filter that filters a first optical signal output from the wavelength tunable optical filter and generating an amplitude distribution representing a distribution of amplitude of the frequency modulation component by detecting the amplitude of the frequency modulation component included in a second optical signal output from the optical filter; and monitoring an arrangement of a transmission wavelength band of the wavelength tunable optical filter, wherein a width of a transmission wavelength band of the optical filter is narrower than a width of a spectrum of one optical signal multiplexed in the WDM optical signal, when the wavelength tunable optical filter filters the WDM optical signal so as to pass a target optical signal among the plurality of optical signals multiplexed in the WDM optical signal, a transmission wavelength of the optical filter is swept for a wavelength range where a spectrum of the target optical signal exists to generate the output-side amplitude distribution representing the distribution of the amplitude of the frequency modulation component for the wavelength range where the spectrum of the target optical signal exists, and the arrangement of the transmission wavelength band of the wavelength tunable optical filter with respect to a spectrum of the target optical signal is monitored based on the output-side amplitude distribution.

6. An optical add-drop multiplexer comprising:

a wavelength selective switch that includes a wavelength tunable optical filter for filtering a wavelength division multiplexing (WDM) optical signal; and a monitoring apparatus that monitors the wavelength tunable optical filter, wherein each of a plurality of optical signals multiplexed in the WDM optical signal carries a data signal and a low-frequency signal and the low-frequency signal is superimposed on a corresponding optical signal in the plurality of optical signals by frequency modulation, and wherein the monitoring apparatus includes:
an optical filter configured to filter a first optical signal output from the wavelength tunable optical filter,
a photodetector configured to convert a second optical signal output from the optical filter into an electric signal;
a detector configured to detect amplitude of the frequency modulation component included in the second optical signal output from the optical filter by detecting amplitude of intensity of the electric signal output from the photodetector,
a generator configured to generate an output-side amplitude distribution representing a distribution of the amplitude of the frequency modulation component detected by the detector, and
a monitoring unit configured to monitor arrangement of a transmission wavelength band of the wavelength tunable optical filter, wherein a width of a transmission wavelength band of the optical filter is narrower than a width of a spectrum of one optical signal multiplexed in the WDM optical signal, when the wavelength tunable optical filter filters the WDM optical signal so as to pass a target optical signal among the plurality of optical signals multiplexed in the WDM optical signal, the generator sweeps a transmission wavelength of the optical filter for a wavelength range where a spectrum of the target optical signal exists to generate the output-side amplitude distribution representing the distribution of the amplitude of the frequency modulation component for the wavelength range where the spectrum of the target optical signal exists, and the monitoring unit monitors the arrangement of the transmission wavelength band of the wavelength tunable optical filter with respect to a spectrum of the target optical signal based on the output-side amplitude distribution generated by the generator.

7. A wavelength control method for controlling a wavelength of an optical signal that is transmitted from a transmitter to a receiver via an optical add-drop multiplexer, the wavelength control method comprising:

adding, at the transmitter, a frequency modulation component to the optical signal;

shifting, at the transmitter, a center wavelength of the optical signal by a specified amount toward a target wavelength;

shifting, at the receiver, a wavelength of local oscillation light for coherently receiving the optical signal by the specified amount toward the target wavelength;

controlling, at the optical add-drop multiplexer, a transmission wavelength band of a wavelength tunable optical filter for filtering the optical signal, according to the shifting of the center wavelength of the optical signal;

sweeping a transmission wavelength of an optical filter that filters the optical signal output from the wavelength tunable optical filter and generating an amplitude distribution representing a distribution of amplitude of the frequency modulation component by detecting the amplitude of the frequency modulation component included in the optical signal output from the optical filter;

monitoring arrangement of a transmission wavelength band of the wavelength tunable optical filter with respect to a spectrum of the optical signal based on the amplitude distribution; and continuing, when the transmission wavelength band of the wavelength tunable optical filter is appropriately controlled with respect to the spectrum of the optical signal, the process of shifting the center wavelength of the optical signal, the process of shifting the wavelength of the local oscillation light, and the process of controlling the transmission wavelength of the wavelength tunable optical filter.

* * * * *